US007200558B2

(12) United States Patent
Kato et al.

(10) Patent No.: US 7,200,558 B2
(45) Date of Patent: Apr. 3, 2007

(54) PROSODY GENERATING DEVICE, PROSODY GENERATING METHOD, AND PROGRAM

(75) Inventors: Yumiko Kato, Neyagawa (JP); Takahiro Kamai, Souraku-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 930 days.

(21) Appl. No.: 10/297,819

(22) PCT Filed: Mar. 8, 2002

(86) PCT No.: PCT/JP02/02164

§ 371 (c)(1), (2), (4) Date: Dec. 6, 2002

(87) PCT Pub. No.: WO02/073595

PCT Pub. Date: Sep. 19, 2002

(65) Prior Publication Data

US 2003/0158721 A1 Aug. 21, 2003

(30) Foreign Application Priority Data

Mar. 8, 2001 (JP) ............................ 2001-065401

(51) Int. Cl.
*G10L 15/00* (2006.01)
*G10L 15/06* (2006.01)

(52) U.S. Cl. ...................... 704/244; 704/239; 704/249; 704/260

(58) Field of Classification Search ................ 704/244, 704/239, 249, 260
See application file for complete search history.

(56) References Cited

U.S. PATENT DOCUMENTS

| | | | | |
|---|---|---|---|---|
| 5,384,893 | A * | 1/1995 | Hutchins | 704/267 |
| 5,790,978 | A * | 8/1998 | Olive et al. | 704/207 |
| 5,995,924 | A * | 11/1999 | Terry | 704/207 |
| 6,101,470 | A * | 8/2000 | Eide et al. | 704/260 |
| 6,240,384 | B1 | 5/2001 | Kagoshima et al. | |
| 6,405,169 | B1 * | 6/2002 | Kondo et al. | 704/258 |

(Continued)

FOREIGN PATENT DOCUMENTS

JP 6-236197 8/1994

(Continued)

*Primary Examiner*—Tālivaldis Ivars Šmits
*Assistant Examiner*—Eunice Ng
(74) *Attorney, Agent, or Firm*—Hamre, Schumann, Mueller & Larson, P.C.

(57) ABSTRACT

A prosody generation apparatus capable of suppressing distortion that occurs when generating prosodic patterns and therefore generating a natural prosody is provided. A prosody changing point extraction unit in this apparatus extracts a prosody changing point located at the beginning and the ending of a sentence, the beginning and the ending of a breath group, an accent position and the like. A selection rule and a transformation rule of a prosodic pattern including the prosody changing point is generated by means of a statistical or learning technique and the thus generate rules are stored in a representative prosodic pattern selection rule table and a transformation rule table beforehand. A pattern selection unit selects a representative prosodic pattern from the representative prosodic pattern selection rule table according to the selection rule. A prosody generation unit transforms the selected pattern according to the transformation rule and carries out interpolation with respect to portions other than the prosody changing points so as to generate prosody as a whole.

28 Claims, 17 Drawing Sheets

U.S. PATENT DOCUMENTS

| | | | | |
|---|---|---|---|---|
| 6,496,801 | B1 * | 12/2002 | Veprek et al. | 704/260 |
| 6,505,158 | B1 * | 1/2003 | Conkie | 704/260 |
| 6,625,575 | B2 * | 9/2003 | Chihara | 704/260 |
| 2001/0021906 | A1 | 9/2001 | Chihara | |
| 2001/0032079 | A1 * | 10/2001 | Okutani et al. | 704/258 |

FOREIGN PATENT DOCUMENTS

| | | |
|---|---|---|
| JP | 9-319391 | 12/1997 |
| JP | 11-95783 | 4/1999 |
| JP | 11-249676 | 9/1999 |
| JP | 11-265194 | 9/1999 |
| JP | 11-272646 | 10/1999 |
| JP | 11-338488 | 12/1999 |
| JP | 2000-10581 | 1/2000 |
| JP | 2000-47680 | 2/2000 |
| JP | 2000-47681 | 2/2000 |
| JP | 2000-75883 | 3/2000 |
| JP | 2001-34284 | 2/2001 |
| JP | 2001-100777 | 4/2001 |
| JP | 2001-242882 | 9/2001 |
| JP | 2001-249677 | 9/2001 |
| JP | 2001-255883 | 9/2001 |

* cited by examiner

PROSODY GENERATING DEVICE, PROSODY GENERATING METHOD, AND PROGRAM

TECHNICAL FIELD

The present invention relates to a prosody generation apparatus and a method of prosody generation, which generate prosodic information based on prosody data and prosody control rules extracted by a speech analysis.

BACKGROUND ART

Conventionally, as disclosed in JP 11(1999)-95783 A, for example, a technology is known for clustering prosodic information included in speech data into a prosody controlling unit such as an accent phrase so as to generate representative patterns. Some representative patterns are selected among the generated representative patterns according to a selection rule, are transformed according to a transformation rule and are connected, so that the prosody as a whole sentence can be generated. The selection rule and the transformation rule regarding the above-described representative patterns are generated through a statistical technique or a learning technique.

However, such a conventional prosody generation method has a problem in that a distortion of the generated prosodic information is considerable due to the presence of the accent phrases having attributes such as a number of moras and an accent type, which are not included in the speech data used when generating the representative patterns.

DISCLOSURE OF THE INVENTION

In view of the above-stated problem, the object of the present invention is to provide a prosody generation apparatus and a method of prosody generation, which are capable of suppressing a distortion that occurs when generating prosodic patterns and therefore generating a natural prosody.

In order to fulfill the above-stated object, a first prosody generation apparatus according to the present invention that receives phonological information and linguistic information so as to generate prosody, and the prosody generation apparatus is operable to refer to (a) a representative prosodic pattern storage unit for accumulating beforehand representative prosodic patterns of portions of speech data, the portions including prosody changing points; (b) a selection rule storage unit that stores a selection rule predetermined according to attributes concerning phonology or attributes concerning linguistic information of the portions of the speech data including the prosody changing points; and (c) a transformation rule storage unit that stores a transformation rule predetermined according to attributes concerning the phonology or the linguistic information of the portions of the speech data including the prosody changing points. The prosody generation apparatus includes: a prosody changing point setting unit that sets a prosody changing point according to at least any one of the received phonological information and the linguistic information; a pattern selection unit that selects a representative prosodic pattern from the representative prosodic pattern storage unit according to the selection rule, based on the received phonological information and the linguistic information; and a prosody generation unit that transforms the representative prosodic pattern selected by the pattern selection unit according to the transformation rule and interpolates a portion that does not include a prosody changing point and located between the thus selected and transformed representative patterns each corresponding to a portion including a prosody changing point.

Note here that the representative prosodic pattern storage unit (a), the selection rule storage unit (b) and the transformation rule storage unit (c) may be included inside of the prosody generation apparatus, or may be constituted as apparatuses separate from the prosody generation apparatus so as to be accessible from the prosody generation apparatus according to the present invention. Alternatively, these storage units may be realized with a recording medium readable for the prosody generation apparatus.

Here, the prosody changing point refers to a section having a duration corresponding to at least one or more phonemes, where a pitch or a power of the speech changes abruptly compared with other regions or where the rhythm of the speech changes abruptly compared with other regions. More specifically, in the case of the Japanese, the prosody changing point includes a starting point of an accent phrase, a termination of an accent phrase, a connecting point between a termination of an accent phrase and the following accent phrase, a point in an accent phrase whose pitch becomes the maximum, which is included in the first to the third moras in the accent phrase, an accent nucleus, a mora following to an accent nucleus, a connecting point between an accent nucleus and a mora following the accent nucleus, a beginning of a sentence, an ending of a sentence, a beginning of a breath group, an ending of a breath group, prominence, emphasis, and the like.

With this configuration, unlike the conventional method employing an accent phrase or the like as the unit of prosody control, prosody is generated by employing a prosody changing point as the unit of prosody control and prosody of portions other than prosody changing points is generated with interpolation. Thereby, the prosody generation apparatus capable of generating a natural prosody with less distortion can be provided. In addition, the prosody generation apparatus according to the present invention has the advantage that the amount of data to be kept for prosody generation can be made smaller compared with the case having a pattern corresponding to a larger unit such as an accent phrase. This is because, in the case of the present invention, a variation in the patterns to be kept is small and each pattern has small amount of data by using a pattern corresponding to a smaller unit. Furthermore, when generating a pattern from natural speech data using a larger unit such as an accent phrase as in the case of the conventional method, a pattern having attributes that are not included in the natural speech data has to be transformed and generated based on the other attributes pattern. This process has a problem of causing distortion. On the other hand, in the case of the present invention, prosody can be controlled using a smaller unit such as a prosody changing point and portions between the patterns are generated with interpolation, whereby prosody with less distortion can be generated while keeping the transformation of the pattern at a minimum.

Note here that the prosody control unit is not limited to the prosody changing point but may include one mora, one syllable, or one phoneme adjacent to the prosody changing point. Then, prosody may be generated using these prosody control units, and prosody of portions other than the prosody changing points and one mora, one syllable, or one phoneme adjacent to these prosody changing points (i.e., portions other than the prosody control units) may be generated with interpolation. Thereby, a discontinuous point does not occur between the prosody changing points and one mora, one syllable, or one phoneme adjacent to these prosody changing points and interpolated portions, so that a prosody generation apparatus capable of generating a natural prosody with less distortion can be provided.

In the above-described first prosody generation apparatus, it is preferable that the representative prosodic patterns are pitch patterns or power patterns.

In the above-described first prosody generation apparatus, it is preferable that the representative prosodic patterns are patterns generated for each of clusters into which patterns of the portions of the speech data including the prosodic changing points are clustered by means of a statistical technique.

In addition, to fulfill the above-stated object, a second prosody generation apparatus according to the present invention that receives phonological information and linguistic information so as to generate prosody, and the prosody generation apparatus is operable to refer to (a) a variation estimation rule storage unit that stores a variation estimation rule of prosody at prosody changing points, the variation estimation rule being predetermined beforehand according to attributes concerning phonology or attributes concerning linguistic information of the prosody changing points of speech data; and (b) an absolute value estimation rule storage unit that stores an absolute value estimation rule of the prosody at the prosody changing points, the absolute value estimation rule being predetermined beforehand according to attributes concerning the phonology or the linguistic information of the prosody changing points of the speech data. The prosody generation apparatus includes: a prosody changing point setting unit that sets a prosody changing point according to at least any one of the received phonological information and the linguistic information; a variation estimation unit that estimates a variation of prosody at the prosody changing point according to the estimation rule stored in the variation estimation rule storage unit, based on the received phonological information and the linguistic information; an absolute value estimation unit that estimates an absolute value of the prosody at the prosody changing point according to the absolute value estimation rule stored in the absolute value estimation rule storage unit, based on the received phonological information and the linguistic information; and a prosody generation unit that generates prosody for a prosody changing point by shifting the variation estimated by the variation estimation unit so as to correspond to the absolute value obtained by the absolute value estimation unit and generates prosody for a portion other than prosody changing points by carrying out interpolation between the thus generated prosody for prosody changing points.

Note here that the variation estimation rule storage unit (a) and the absolute value estimation rule storage unit (b) may be included inside of the prosody generation apparatus, or may be constituted as apparatuses separate from the prosody generation apparatus so as to be accessible from the prosody generation apparatus according to the present invention. Alternatively, these storage units may be realized with a recording medium readable for the prosody generation apparatus.

According to the second prosody generation apparatus, since the variation of the prosody changing point is estimated, pattern data of prosody becomes unnecessary. Therefore, this apparatus has the advantage of further reducing the amount of data to be kept for prosody generation. In addition, since the variation of the prosody changing point is estimated without using a prosodic pattern, the distortion due to the pattern transformation does not occur. Furthermore, since the apparatus does not have any fixed prosodic patterns but estimates a variation of a prosody changing point based on the received phonological information and linguistic information, prosodic information can be generated more flexibly.

In the above-described second prosody generation apparatus, it is preferable that the variation of the prosody is a variation in pitch or a variation in power.

In the above-described second prosody generation apparatus, it is preferable that the variation estimation rule is obtained by formulating a relationship between (i) a variation in prosody at a prosody changing point of the speech data and (ii) attributes concerning phonology or attributes concerning linguistic information of moras or syllables corresponding to the prosody changing point, by means of a statistical technique or a learning technique so as to predict a variation of prosody using at least one of the attributes concerning phonology and the attributes concerning linguistic information. Here, it is preferable that the statistical technique is the Quantification Theory Type I where the variation in prosody is designated as a criterion variable.

In the above-described second prosody generation apparatus, it is preferable that the absolute value estimation rule is obtained by formulating a relationship between (i) an absolute value of a referential point for calculating a prosody variation at a prosody changing point of the speech data and (ii) attributes concerning phonology or attributes concerning linguistic information of moras or syllables corresponding to the changing point, by means of a statistical technique or a learning technique so as to predict an absolute value of a referential point for calculating a prosody variation using at least one of the attributes concerning phonology and the attributes concerning linguistic information. Here, it is preferable that the statistical technique is the Quantification Theory Type I where the absolute value of the referential point for calculating the prosody variation is designated as a criterion variable or the Quantification Theory Type I where a shifting amount of the referential point for calculating the prosody variation is designated as a criterion variable.

In the above-described first or second prosody generation apparatus, it is preferable that the prosody changing point includes at least one of a beginning of an accent phrase, an ending of an accent phrase and an accent nucleus.

In the above-described first or second prosody generation apparatus, assuming that a difference in pitch between adjacent moras or adjacent syllables of the speech data is $\Delta P$, the prosody changing point may be a point where the $\Delta P$ and an immediately following $\Delta P$ are different in sign. In addition, the prosody changing point may be a point where a sum of the $\Delta P$ and the immediately following $\Delta P$ exceeds a predetermined value.

Alternatively, in the above-described first or second prosody generation apparatus, assuming that a difference in pitch between adjacent moras or adjacent syllables of the speech data is $\Delta P$, the prosody changing point may be a point where the $\Delta P$ and an immediately following $\Delta P$ have a same sign and a ratio (or a difference) between the $\Delta P$ and the immediately following $\Delta P$ exceeds a predetermined value. In addition, assuming that the $\Delta P$ is obtained by subtracting a pitch of a preceding mora or syllable from a pitch of a following mora or syllable of the adjacent moras or syllables, the prosody changing point may be (1) a point where signs of the $\Delta P$ and the immediately following $\Delta P$ are minus, and a ratio between the $\Delta P$ and the immediately following $\Delta P$ is in a range of 1.5 to 2.5 and exceeds a predetermined value, or (2) a point where signs of the $\Delta P$ and the immediately following $\Delta P$ are minus, a sign of an immediately preceding $\Delta P$ is plus, and a ratio between the $\Delta P$ and the immediately following $\Delta P$ is in a range of 1.2 to 2.0 and exceeds a predetermined value.

In the above-described first or second prosody generation apparatus, it is preferable that the prosody changing point setting unit sets the prosody changing point using at least one of the received phonological information and linguistic information, according to a prosody changing point extraction rule predetermined based on attributes concerning the phonology and attributes concerning the linguistic information of the prosody changing point of the speech data. In addition, it is preferable that the prosody changing point extraction rule is obtained by formulating a relationship between (i) a classification as to whether adjacent moras or syllables of the speech data are a prosody changing point or not and (ii) attributes concerning phonology or attributes concerning linguistic information of the adjacent moras or syllables, by means of a statistical technique or a learning technique so as to predict whether a point is a prosody changing point or not using at least one of the attributes concerning phonology and the attributes concerning linguistic information.

In the above-described first or second prosody generation apparatus, assuming that a difference in power between adjacent moras or adjacent syllables of the speech data is $\Delta A$, the prosody changing point may be a point where the $\Delta A$ and an immediately following $\Delta A$ are different in sign. In addition, the prosody changing point may be a point where a sum of an absolute value of the $\Delta A$ and an absolute value of the immediately following $\Delta A$ exceeds a predetermined value.

In the above-described first or second prosody generation apparatus, assuming that a difference in power between adjacent moras or adjacent syllables of the speech data is $\Delta A$, the prosody changing point may be a point where the $\Delta A$ and an immediately following $\Delta A$ have a same sign and a ratio (or a difference) between the $\Delta A$ and the immediately following $\Delta A$ exceeds a predetermined value.

Note here that a difference in power of vowels included in the adjacent moras or the adjacent syllables can be used as the difference in power between the adjacent moras or the adjacent syllables.

In the above-described first or second prosody generation apparatus, assuming that a difference between values obtained by standardizing time lengths of adjacent moras, syllables or phonemes of the speech data for each type of phonology is $\Delta D$, the prosody changing point may be (1) a point where the $\Delta D$ exceeds a predetermined value, or (2) a point where the $\Delta D$ and an immediately following $\Delta D$ are different in sign. In the case of (2), the prosody changing point may be a point where a sum of an absolute value of the $\Delta D$ and an absolute value of the immediately following $\Delta D$ exceeds a predetermined value.

In the above-described first or second prosody generation apparatus, assuming that a difference between values obtained by standardizing time lengths of adjacent moras, syllables or phonemes of the speech data for each type of phonology is $\Delta D$, the prosody changing point may be a point where the $\Delta D$ and an immediately following $\Delta D$ have a same sign and a ratio (a difference) between the $\Delta D$ and the immediately following $\Delta D$ exceeds a predetermined value.

In the above-described first or second prosody generation apparatus, it is preferable that the attributes concerning phonology includes one or more of the following attributes: (1) the number of phonemes, the number of moras, the number of syllables, an accent position, an accent type, an accent strength, a stress pattern or a stress strength of an accent phrase, a clause, a stress phrase, or a word; (2) the number of moras, the number of syllables or the number of phonemes counted from a beginning of a sentence, a phrase, an accent phrase, a clause, or a word; (3) the number of moras, the number of syllables, or the number of phonemes counted from an ending of a sentence, a phrase, an accent phrase, a clause, or a word; (4) the presence or absence of adjacent pauses; (5) a time length of adjacent pauses; (6) a time length of a pause located before and the nearest to the prosody changing point; (7) a time length of a pause located after and the nearest to the prosody changing point; (8) the number of moras, the number of syllables or the number of phonemes counted from a pause located before and the nearest to the prosody changing point; (9) the number of moras, the number of syllables or the number of phonemes counted from a pause located after and the nearest to the prosody changing point; and (10) the number of moras, the number of syllables or the number of phonemes counted from an accent nucleus or a stress position. In the above-described prosody generation apparatus, it is preferable that the attributes concerning linguistic information includes one or more of the following attributes: a part of speech, an attribute concerning a modification structure, a distance to a modifiee, a distance to a modifier, an attribute concerning syntax, prominence, emphasis, or semantic classification of an accent phrase, a clause, a stress phrase, or a word. By employing a selection rule and a transformation rule prescribed using these variable, the accuracy in selection and the estimated accuracy in the amount of transformation can be enhanced.

In the above-stated first prosody generation apparatus, it is preferable that the selection rule is obtained by formulating a relationship between (i) clusters corresponding to the representative patterns and into which prosodic patterns of the speech data are clustered and classified and (ii) attributes concerning phonology or attributes concerning linguistic information of each of the prosodic patterns, by means of a statistical technique or a learning technique so as to predict a cluster to which a prosodic pattern including the prosody changing point belongs, using at least one of the attributes concerning phonology and the attributes concerning linguistic information.

In the above-described prosody generation apparatus, it is preferable that the transformation is a parallel shifting along a frequency axis of a pitch pattern or along a logarithmic axis of a frequency of a pitch pattern.

In the above-described prosody generation apparatus, it is preferable that the transformation is a parallel shifting along an amplitude axis of a power pattern or along a power axis of a power pattern.

In the above-described prosody generation apparatus, it is preferable that the transformation is compression or extension in a dynamic range on a frequency axis or on a logarithmic axis of a pitch pattern.

In the above-described prosody generation apparatus, it is preferable that the transformation is compression or extension in a dynamic range on an amplitude axis or on a power axis of a power pattern.

In the above-described prosody generation apparatus, it is preferable that the transformation rule is obtained by clustering prosodic patterns of the speech data into clusters corresponding to the representative patterns so as to produce a representative pattern for each cluster and by formulating a relationship between (i) a distance between each of the prosodic patterns and a representative pattern of a cluster to which the prosodic pattern belongs and (ii) attributes concerning phonology or attributes concerning linguistic information of the prosodic pattern, by means of a statistical technique or a learning technique so as to estimate an amount of transformation of the selected prosodic pattern, using at least one of the attributes concerning phonology and the attributes concerning linguistic information.

In the above-described prosody generation apparatus, it is preferable that the amount of transformation is one of a shifting amount, a compression rate in a dynamic range and an extension rate in a dynamic range.

In the above-described prosody generation apparatus, it is preferable that the statistical technique is a multivariate analysis, a decision tree, the Quantification Theory Type II where a type of the cluster is designated as a criterion variable, the Quantification Theory Type I where a distance between a representative prosodic pattern in a cluster and each prosodic data is designated as a criterion variable, the Quantification Theory Type I where the shifting amount of a representative prosodic pattern is designated as a criterion variable, or the Quantification Theory Type I where a compression rate or an extension rate in a dynamic range of a representative prosodic pattern of a cluster is designated as a criterion variable.

In the above-described prosody generation apparatus, it is preferable that the learning technique is by means of a neural net.

In the above-described prosody generation apparatus, it is preferable that the interpolation is a linear interpolation, by means of a spline function, or by means of a sigmoid curve.

In addition, in order to fulfill the above-stated object, a first prosody generation method according to the present invention, by which phonological information and linguistic information are inputted so as to generate prosody, includes the steps of: setting a prosody changing point according to at least any one of the inputted phonological information and linguistic information; selecting a prosodic pattern from representative prosodic patterns for portions including prosody changing points of speech data according to a selection rule predetermined beforehand based on attributes concerning phonology or attributes concerning linguistic information of the portions including the prosodic changing points; and transforming the selected prosodic pattern according to a transformation rule predetermined beforehand based on attributes concerning the phonology or attributes concerning the linguistic information of the portions including the prosodic changing points, and interpolating a portion that does not include a prosody changing point and located between the thus selected and transformed representative patterns each corresponding to a portion including a prosody changing point.

According to this method, unlike the conventional method employing an accent phrase or the like as the unit of prosody control, prosody is generated by employing a portion including a prosody changing point as the unit of prosody control and prosodic information on portions other than prosody changing points is generated with interpolation. Thereby, a natural prosody with less distortion can be generated.

In addition, in order to fulfill the above-stated object, a second prosody generation method according to the present invention by which phonological information and linguistic information are inputted so as to generate prosody, includes the steps of: setting a prosody changing point according to at least any one of the inputted phonological information and linguistic information; estimating a variation of prosody at the prosody changing point according to a variation estimation rule predetermined beforehand according to attributes concerning phonology or attributes concerning linguistic information of the prosody changing point of speech data, based on the inputted phonological information and linguistic information; estimating an absolute value of the prosody at the prosody changing point according to an absolute value estimation rule predetermined beforehand according to attributes concerning the phonology or the linguistic information of the prosody changing point of the speech data, based on the inputted phonological information and the linguistic information; and generating prosody for a prosody changing point by shifting the estimated variation so as to correspond to the estimated absolute value and generating prosody for a portion other than prosody changing points by carrying out interpolation between the thus generated prosody for prosody changing points.

According to this method, unlike the conventional method employing an accent phrase or the like as the unit of prosody control, prosody is generated by employing a portion including a prosody changing point as the unit of prosody control and prosodic information on portions other than prosody changing points is generated with interpolation. Thereby, a natural prosody with less distortion can be generated. In addition, since pattern data of prosody becomes unnecessary, this apparatus has the advantage of further reducing the amount of data to be kept for prosody generation.

In addition, in order to fulfill the above-stated object, a first program according to the present invention, which has a computer conduct a procedure of receiving phonological information and linguistic information so as to generate prosody, and the computer is operable to refer to (a) a representative prosodic pattern storage unit for accumulating beforehand representative prosodic patterns of portions of speech data, the portions including prosody changing points; (b) a selection rule storage unit that stores a selection rule predetermined according to attributes concerning phonology or attributes concerning linguistic information of the portions of the speech data including the prosody changing points; and (c) a transformation rule storage unit that stores a transformation rule predetermined according to attributes concerning the phonology or the linguistic information of the portions of the speech data including the prosody changing points. The program has the computer conduct the steps of: setting a prosody changing point according to at least any one of the received phonological information and the linguistic information; selecting a representative prosodic pattern from the representative prosodic pattern storage unit according to the selection rule, based on the received phonological information and the linguistic information; and transforming the representative prosodic pattern selected by the pattern selection unit according to the transformation rule and interpolating a portion that does not include a prosody changing point and located between the thus selected and transformed representative patterns each corresponding to a portion including a prosody changing point.

In addition, in order to fulfill the above-stated object, a second program according to the present invention, which has a computer conduct a procedure of receiving phonological information and linguistic information so as to generate prosody, and the computer is operable to refer to (a) a variation estimation rule storage unit that stores a variation estimation rule of prosody at prosody changing points, the variation estimation rule being predetermined beforehand according to attributes concerning phonology or attributes concerning linguistic information of the prosody changing points of speech data; and (b) an absolute value estimation rule storage unit that stores an absolute value estimation rule of the prosody at the prosody changing points, the absolute value estimation rule being predetermined beforehand according to attributes concerning the phonology or the linguistic information of the prosody changing point of the speech data. The program has the computer conduct the steps of: setting a prosody changing point according to at least any one of the received phonological information and the linguistic information; estimating a variation of prosody at the prosody changing point according to the estimation rule stored in the variation estimation rule storage unit, based on the received phonological information and the linguistic information; estimating an absolute value of the prosody at the prosody changing point according to the absolute value estimation rule stored in the absolute value estimation rule storage unit, based on the received phonological information and the linguistic information; and generating prosody for a prosody changing point by shifting the variation estimated by the variation estimation unit so as to correspond to the absolute value obtained by the absolute value estimation unit and generating prosody for a portion other than prosody changing points by carrying out interpolation between the thus generated prosody for prosody changing points.

BEST MODE FOR CARRYING OUT THE INVENTION

Embodiment 1

Figure 1:
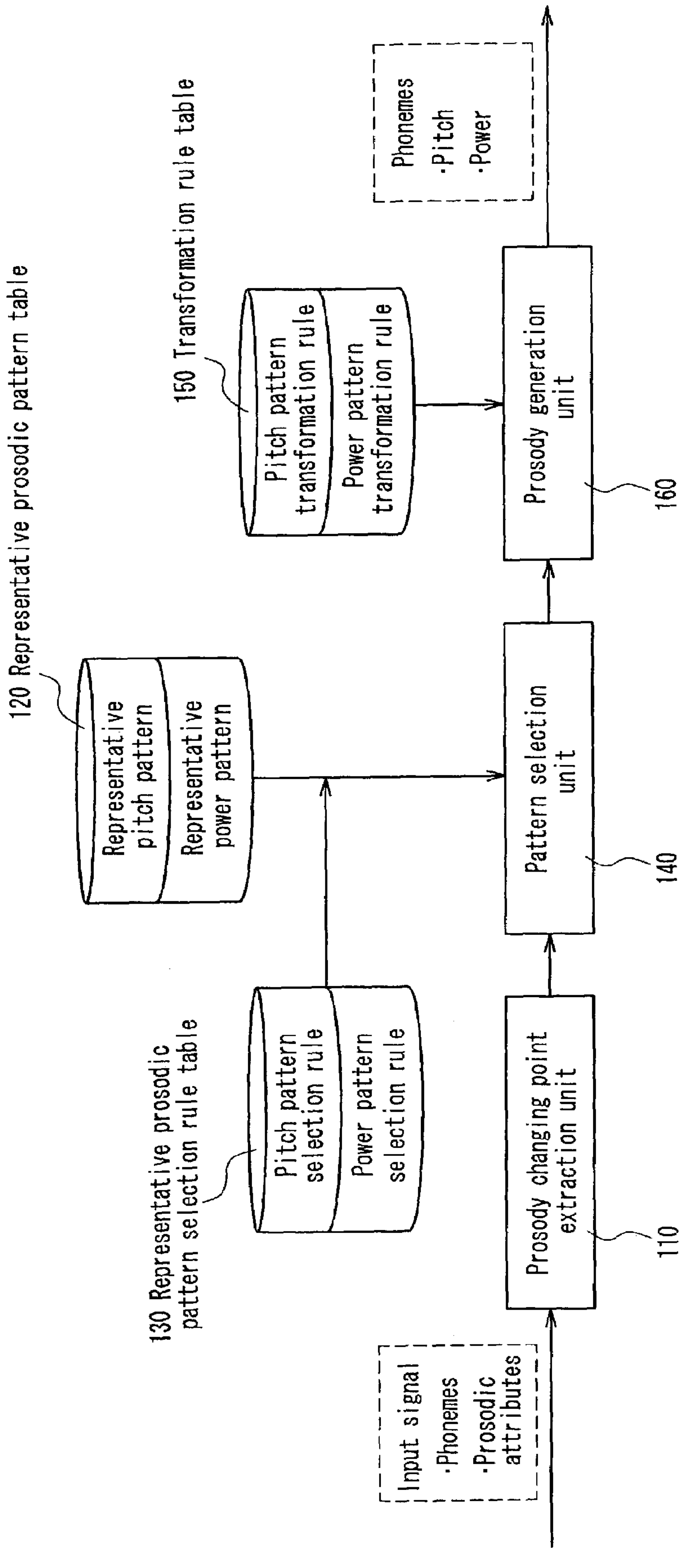
FIG. 1 is a block diagram showing a configuration of a prosody generation apparatus according to Embodiment 1 of the present invention.
Figure 2:
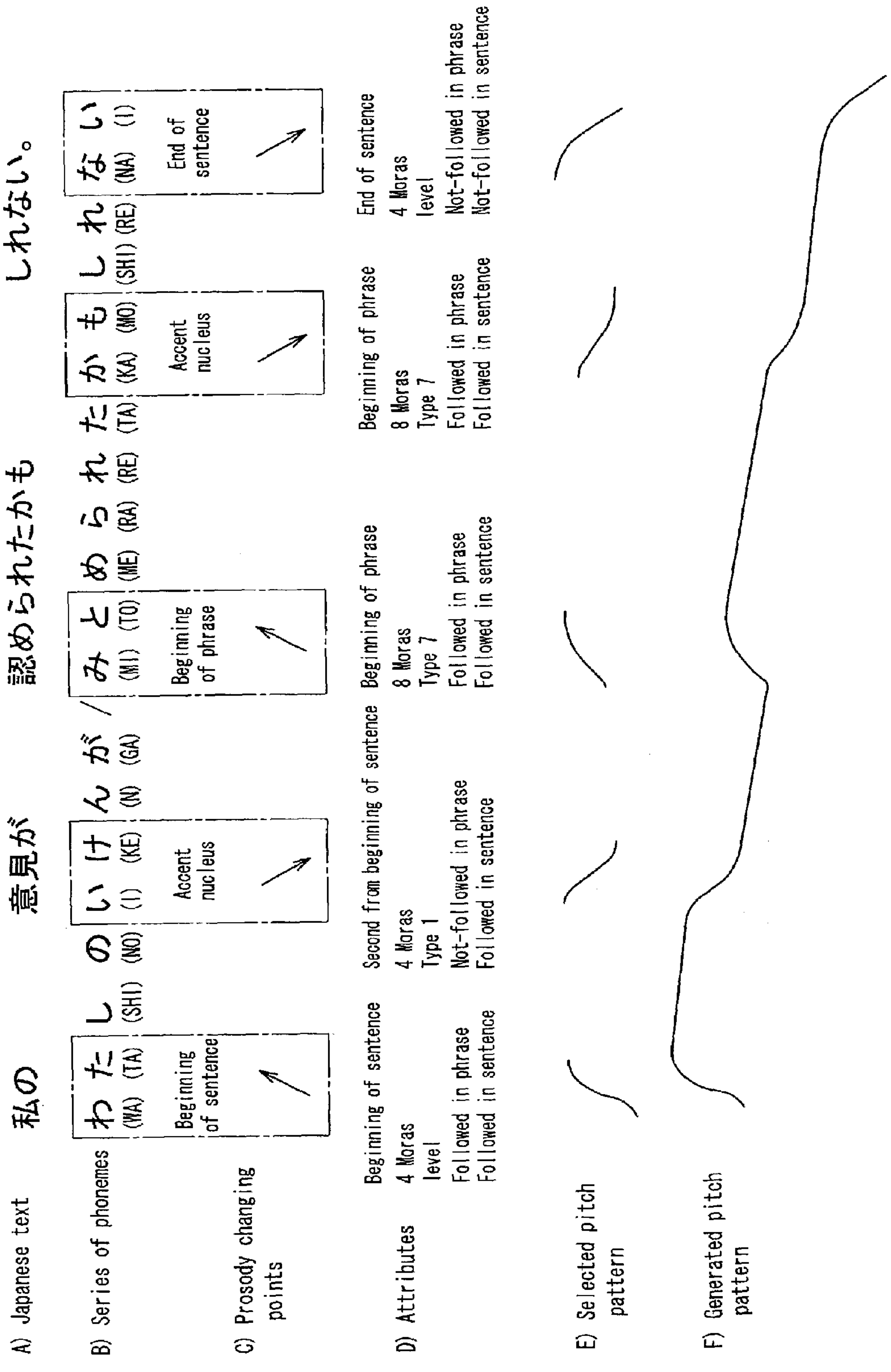
FIG. 2 explains a procedure for prosody generation by the above-described prosody generation apparatus.

The following describes one embodiment of the present invention, with reference to FIGS. 1 and 2.

FIG. 1 is a block diagram showing functions of a prosody generation apparatus as one embodiment of the present invention, and FIG. 2 explains an example of information being subjected to processing steps.

As shown in FIG. 1, the prosody generation apparatus according to this embodiment includes a prosody changing point extraction unit 110, a representative prosodic pattern table 120, a representative prosodic pattern selection rule table 130, a pattern selection unit 140, a transformation rule table 150 and a prosody generation unit 160. Note here that the present system may be constructed as a single apparatus provided with all of these functioning blocks, or may be constructed as a combination of a plurality of apparatuses each operable independently and provided with one or more of the above functioning blocks. In the latter case, if each apparatus is provided with a plurality of functioning blocks, any functioning blocks described above can be included freely.

The prosody changing point extraction unit 110 (as a prosody changing point setting unit) receives as input signals a series of phonemes as a target of the prosody generation for generating a synthetic speech and linguistic information such as an accent position, an accent breaking, a part of speech and a modification structure. Then, the prosody changing point extraction unit 110 extracts prosody changing points in the received series of phonemes.

The representative prosodic pattern table 120 is a table to store a representative pattern of each of clusters obtained by clustering each of the pitch and the power of two moras having a prosody changing point. The representative prosodic pattern selection rule table 130 is a table to store a selection rule for selecting a representative pattern based on attributes of the prosody changing points. The pattern selection unit 140 selects a representative pitch pattern and a representative power pattern for each of the prosody changing points output from the prosody changing point extraction unit 110, from the representative prosodic pattern table 120 according to the selection rule stored in the representative pattern selection rule table 130.

The transformation rule table 150 is a table to store a rule for determining shifting amounts of the pitch pattern and the power pattern stored in the representative prosodic pattern table 120, where the shifting of the pitch pattern and the power pattern are carried out along a logarithmic axis of a frequency and a logarithmic axis of a power. Note here that these shifting amounts may be along the frequency axis and along the power axis, instead of the logarithmic axes. Such transformation along the frequency axis and the power axis is advantageous because of the simplicity. On the other hand, the transformation along the logarithmic axes has the advantage of making the axis linear to the sense level of the human being and therefore being less in an auditory distortion due to the transformation. The shifting may be carried out in parallel, or compression or extension may be carried out in a dynamic range on the axes.

The prosody generation unit 160 transforms the pitch pattern and the power pattern corresponding to each prosody changing point, which is selected by the pattern selection unit 140, according to the transformation rule stored in the transformation rule table 150, and interpolates a portion between the patterns corresponding to the prosody changing points, so that information as to the pitch and the power corresponding to all of the inputted series of phonemes is generated.

The following describes operations of the prosody generation apparatus configured in this way, referring to an example shown in FIG. 2. In the case where the Japanese text as a target of the prosody generation is 「私の意見が認められたかもしれない。」 as shown in A) of FIG. 2, a series of phonemes "watashi no iken ga/(silent) mitomeraretakamosirenai" as shown in B) of FIG. 2 and the number of moras and the accent type as attributes for each phrase as shown in D) of FIG. 2 are inputted into the prosody changing point extraction unit 110.

The prosody changing point extraction unit 110 extracts the beginning and the ending of a breath group and the beginning and the ending of a sentence from the inputted series of phonemes. Also, the prosody changing point extraction unit 110 extracts a leading edge and an accent position of an accent phrase from the series of phonemes and the attributes of the phrase. Further, the prosody changing point extraction unit 110 combines information as to the beginning and the ending of the breath group, the beginning and the ending of the sentence, the accent phrase and the accent position so as to extract prosody changing points as shown in C) of FIG. 2.

The pattern selection unit 140 selects a pattern of the pitch and the power for each prosody changing point as shown in E) of FIG. 2 from the representative prosodic pattern table 120 according to the rule stored in the representative pattern selection rule table 130.

The prosody generation unit 160 shifts the pattern selected by the pattern selection unit 140 for each prosody changing point along the logarithmic axis according to the transformation rule formulated based on the attributes of the prosody changing point, which is stored in the transformation rule table 150. Further, the prosody generation unit 160 conducts linear interpolation along the logarithmic axis to portions between patterns of the prosody changing points so that a pitch and a power corresponding to a phoneme to which the pattern is not applicable is generated, whereby a pitch pattern and a power pattern corresponding to the series of phonemes are output. Note here that instead of the linear interpolation, a spline function and a sigmoid curve also are available for the interpolation, which has the advantage of realizing a smoother connected synthesized speech.

Data stored in the representative prosodic pattern table 120 is generated, for example, by the following clustering technique (See Dictionary of Statistics, edited by Takeuchi Kei et al. published by Toyo Keizai Inc., 1989): that is, in order to obtain correlations between pitch patterns and between power patterns of prosody changing points extracted from a real speech, a distance between the patterns is calculated with a correlation matrix calculated as to a combination among these patterns. As the clustering method, a general statistical technique other than such a technique may be used.

Data stored in the representative pattern selection rule table 130 is obtained, for example, as follows: categorical data such as attributes of the phrases included in the pitch patterns and the power patterns at prosody changing points extracted from a real speech or attributes such as positions of the pitch patterns and the power patterns in a breath group or a sentence are designated as explanatory variables, and information as to a category into which each of the pitch patterns and the power patterns are classified is designated as a criterion variable. Thus, the data to be stored is a numerical value of each of the variables corresponding to the categories according to the Quantification Theory Type II (See Dictionary of Statistics described above), and the pattern selection rule is a prediction relation obtained by the Quantification Theory Type II using the thus stored numerical values.

The method for obtaining numerical values of the data to be stored in the representative pattern selection rule table 130 is not limited to this technique, but the values can be obtained, for example, by using the Quantification Theory Type I (See Dictionary of Statistics described above) where a distance between a representative value of the category into which each of the pitch patterns or the power patterns is classified and the pattern is designated as a criterion variable, or by using the Quantification Theory Type I where the shifting amount of the representative value is designated as a criterion variable.

Data stored in the transformation rule table 150 is obtained, for example, as follows: a distance between a representative value of the category into which each of the pitch patterns or the power patterns is classified and the pattern is designated as a criterion variable, where the pitch patterns and the power patterns are those of prosody changing points extracted from a real speech, and categorical data such as attributes of phrases included in each of the pitch patterns and the power patterns and attributes such as their positions in a breath group and a sentence are designated as explanatory variables. Then, the data stored in the table is numerical values of each of the variables corresponding to the categories obtained by the Quantification Theory Type I (See Dictionary of Statistics describe above). The transformation rule is a prediction relation obtained by using the thus stored numerical values according to the Quantification Theory Type I. As the criterion variable, the compression rate or the extension rate in the dynamic range of the representative values may be used.

What can be used as the above-stated categorical data includes attributes concerning phonology and attributes concerning linguistic information. As examples of the attributes concerning the phonology, (1) the number of moras, the number of syllables, an accent position, an accent type, an accent strength, a stress pattern, or a stress strength of an accent phrase, a clause, a stress phrase, or a word; (2) the number of moras, the number of syllables, or the number of phonemes counted from the beginning of a sentence, a phrase, an accent phrase, a clause, or a word; (3) the number of moras, the number of syllables, or the number of phonemes counted from the ending of a sentence, a phrase, an accent phrase, a clause, or a word; (4) the presence or absence of adjacent pauses; (5) the duration length of adjacent pauses; (6) the duration length of a pause located before and the nearest to the prosody changing point; and (7) the duration length of a pause located after and the nearest to the prosody changing point can be listed. Note here that any one of the above (1) to (7) may be used, or a combination of some of these attributes may be used. As examples of the attributes concerning linguistic information, one or more of a part of speech, an attribute of a modification structure, a distance to a modifiee, a distance to a modifier, an attribute of syntax and the like concerning an accent phrase, a clause, a stress phrase, or a word can be used. By employing the selection rule and the transformation rule formulated using these variables, the accuracy in selection and the estimated accuracy in the amount of transformation can be enhanced.

Note here that although the above-described selection rule and transformation rule are generated using a statistical technique, a multivariate analysis, a decision tree, or the like may be used as the statistical technique, in addition to the above-described Quantification Theory Type I or the Quantification Theory Type II. Alternatively, these rules can be generated using not a statistical technique but a learning technique employing a neural net, for example.

As stated above, according to the prosody generation apparatus of this embodiment, pitch patterns and power patterns of a limited portion including prosody changing points are kept, selection and transformation rules of the patterns are formulated using a leaning or statistical technique, and a portion between the patterns is obtained with interpolation. Thereby, prosody can be generated without loss of the naturalness of the prosody. Also, the prosodic information to be kept can be decreased considerably.

Note here that the present invention can be embodied as a program that has a computer conduct the operations of the prosody generation apparatus described as to this embodiment.

Embodiment 2

Embodiment 2 of the present invention will be described in the following, with reference to FIGS. 3 to 10.

A prosody generation apparatus according to this embodiment includes two systems: (1) a system for generating a representative pattern, a pattern selection rule, a pattern transformation rule, and a changing point extraction rule based on a natural speech, and accumulating the same (pattern/rule generation unit); and (2) a system for receiving phonological information and linguistic information and generating prosodic information using the representative patterns and the rules accumulated in the above-described pattern/rule generation unit (prosodic information generation unit). The prosody generation apparatus according to this embodiment can be realized as a single apparatus provided with both of these systems, or can be realized including both of these systems as separate apparatuses. The following description deals with the example where these systems are realized as separate apparatuses.

Figure 3:
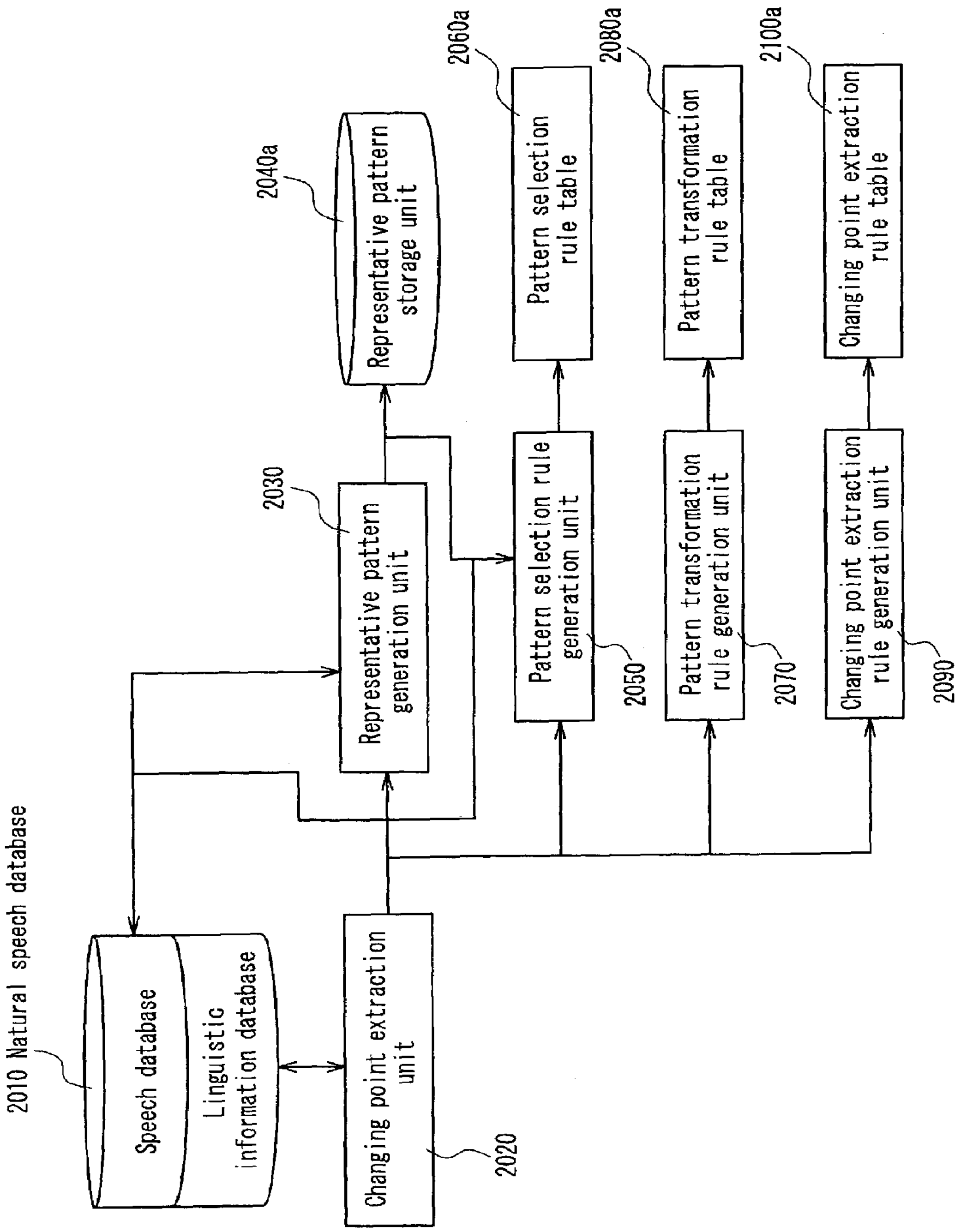
FIG. 3 is a block diagram showing a configuration of a pattern/rule generation apparatus of a prosody generation apparatus according to Embodiment 2 of the present invention.
Figure 4:
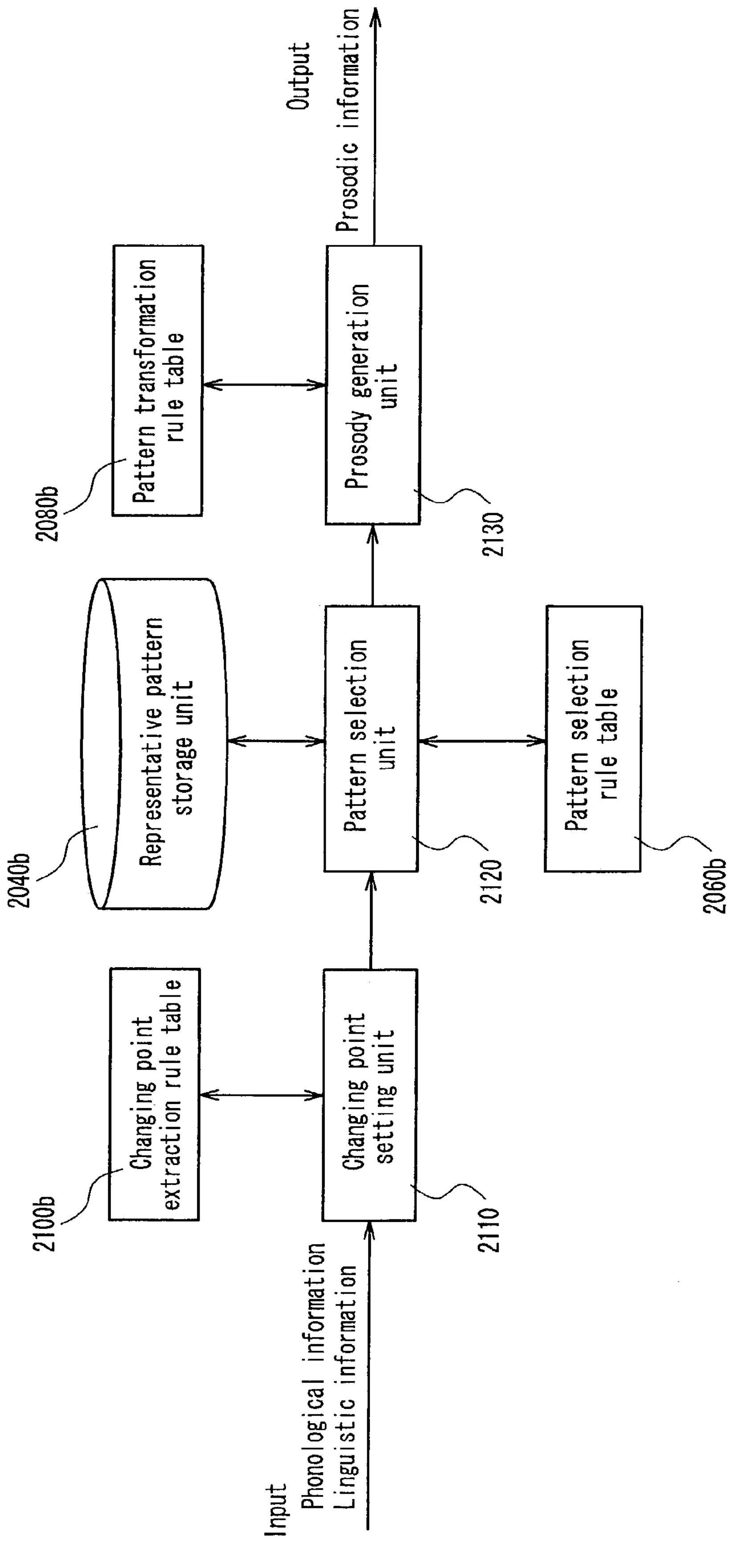
FIG. 4 is a block diagram showing a configuration of a prosodic information generation apparatus of the prosody generation apparatus according to Embodiment 2 of the present invention.
Figure 5:
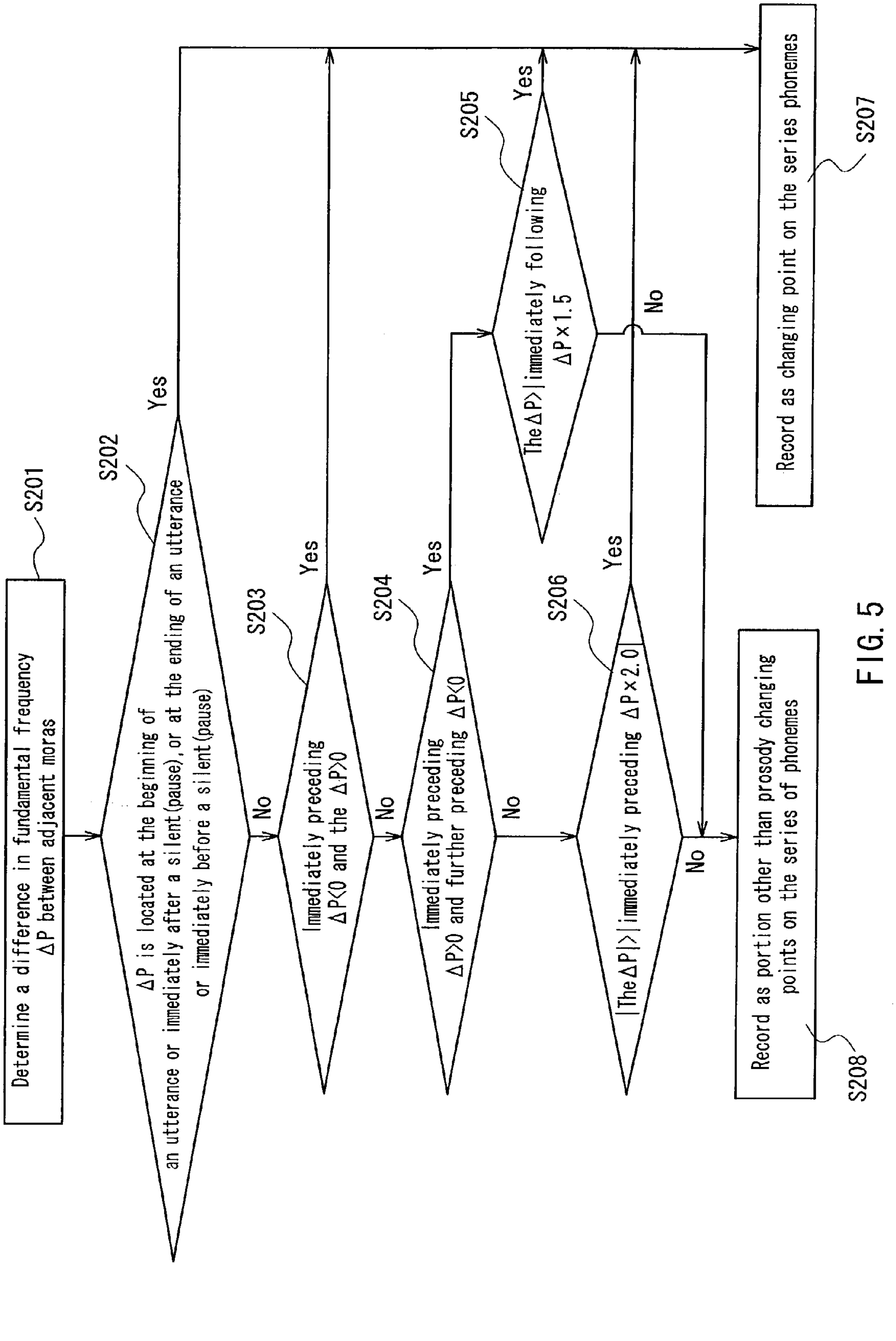
FIG. 5 is a flowchart showing a part of the operations by the pattern/rule generation apparatus according to Embodiment 2.

FIG. 3 is a block diagram showing a configuration of a pattern/rule generation apparatus functioning as the above-described pattern/rule generation unit of the prosody generation apparatus according to this embodiment. FIG. 4 is a block diagram showing a configuration of a prosodic information generation apparatus functioning as the above-described prosodic information generation unit. FIGS. 5, 6, 7, 8 and 9 are flowcharts showing operations of the pattern/rule generation apparatus shown in FIG. 3. FIG. 10 is a flowchart showing operations of the prosodic information generation apparatus shown in FIG. 4.

As shown in FIG. 3, the pattern/rule generation apparatus according to this embodiment includes a natural speech database 2010, a changing point extraction unit 2020, a representative pattern generation unit 2030, a representative pattern storage unit 2040*a*, a pattern selection rule generation unit 2050, a pattern selection rule table 2060*a*, a pattern transformation rule generation unit 2070, a pattern transformation rule table 2080*a*, a changing point extraction rule generation unit 2090 and a changing point extraction rule table 2100*a*.

As shown in FIG. 4, the prosodic information generation apparatus according to this embodiment includes a changing point setting unit 2110, a changing point extraction rule table 2100*b*, a pattern selection unit 2120, a representative pattern storage unit 2040*b*, a pattern selection rule table 2060*b*, a prosody generation unit 2130 and a pattern transformation rule table 2080*b*. Here, the representative patterns stored in the representative pattern storage unit 2040*a* in the pattern/rule generation apparatus shown in FIG. 3 are copied to the representative pattern storage unit 2040*b*. Similarly, the rules stored in the pattern selection rule table 2060*a*, the pattern transformation rule table 2080*a* and the changing point extraction rule table 2100*a* in the pattern/rule generation apparatus shown in FIG. 3 are copied to the pattern selection rule table 2060*b*, the pattern transformation rule table 2080*b* and the changing point extraction rule table 2 100*b*, respectively. Note here that the copying operation of the representative patterns and various rules from the pattern/rule generation apparatus to the prosodic information generation apparatus may be conducted only prior to shipment of the prosodic information generation apparatus, or the apparatus may be configured so that the copying operation is conducted successively also during the operation of the prosodic information generation apparatus. In the latter case, a suitable communication means has to be connected between the pattern/rule generation apparatus and the prosodic information generation apparatus.

The following describes operations of the pattern/rule generation apparatus, with reference to FIGS. 5 to 8. The changing point extraction unit 2020 extracts a fundamental frequency for each mora from the natural speech database 2010 that keeps a natural speech and acoustic characteristics data and linguistic information corresponding to the speech. Also, the changing point extraction unit 2020 determines a difference ΔP between the extracted fundamental frequency for each mora and a fundamental frequency of the immediately preceding mora, based on the following formula (Step S201):

$$\Delta P = \text{the fundamental frequency of the mora} - \text{the fundamental frequency of the immediately preceding mora}$$

If ΔP is a difference between a fundamental frequency of a mora at the beginning of an utterance or immediately after a pause and that of the following mora, or if ΔP is a difference between a fundamental frequency of a mora at the ending of an utterance or immediately before a pause and that of the immediately preceding mora (i.e., a result of Step S202 is Yes), the mora and the immediately preceding mora are recorded as a prosody changing point so as to correspond to the series of phonemes (Step S207).

On the other hand, in Step S202, if ΔP is not a difference between a fundamental frequency of a mora at the beginning of an utterance or immediately after a pause and that of the following mora, or if ΔP is not a difference between a fundamental frequency of a mora at the ending of an utterance or immediately before a pause and that of the immediately preceding mora (i.e., a result of Step S202 is No), then the changing point extraction unit 2020 judges a combination of signs of the immediately preceding ΔP and the ΔP (Step S203).

In Step S203, if the sign of the immediately preceding ΔP is minus and the sign of the ΔP is plus (i.e., a result of Step S203 is Yes), then the mora and the immediately preceding mora are recorded as a prosody changing point so as to correspond to the series of phonemes (Steps S207). On the other hand, in Step S203, if the sign of the immediately preceding ΔP is not minus, or if the sign of the ΔP is not plus (i.e., a result of Step S203 is No), then the changing point extraction unit 2020 judges a combination of signs of the further preceding ΔP and the ΔP (Step S204).

In Step S204, if the sign of the immediately preceding ΔP is plus and the sign of the further preceding ΔP is minus (i.e., a result of Step S204 is Yes), then the ΔP and the immediately following ΔP are compared (Step S205). In Step S205, if the ΔP is larger than 1.5 times the value of the immediately following ΔP (i.e., a result of Step S205 is Yes), then the mora and the immediately preceding mora are recorded as a prosody changing point so as to correspond to the series of phonemes (Step S207). In Step S204, if the sign of the immediately preceding ΔP is not plus, or if the sign of the further preceding ΔP is not minus (i.e., a result of Step S204 is No), then the ΔP and the immediately preceding ΔP are compared (Step S206). In Step S206, if the ΔP is larger than 2.0 times the immediately preceding ΔP (i.e., a result of Step S206 is Yes), then the mora and the immediately preceding mora are recorded as a prosody changing point so as to correspond to the series of phonemes (Step S207) In Step S205, if the ΔP does not exceed 1.5 times the immediately following ΔP, or in Steps S206, if the absolute value of the ΔP does not exceed the absolute value of 2.0 times the immediately preceding ΔP, the mora and the immediately preceding mora are recorded as a portion other than prosody changing points so as to correspond to the series of phonemes (Step S208).

As stated above, the changing point extraction unit 2020 extracts a prosody changing point represented by two consecutive moras from the series of phonemes and stores the prosody changing point so as to correspond to the series of phonemes. Note here that although the judgment as to the prosody changing point is conducted based on the ratio between ΔPs of the consecutive adjacent moras, the judgment may be conducted based on a difference between ΔPs of the adjacent moras.

Figure 6:
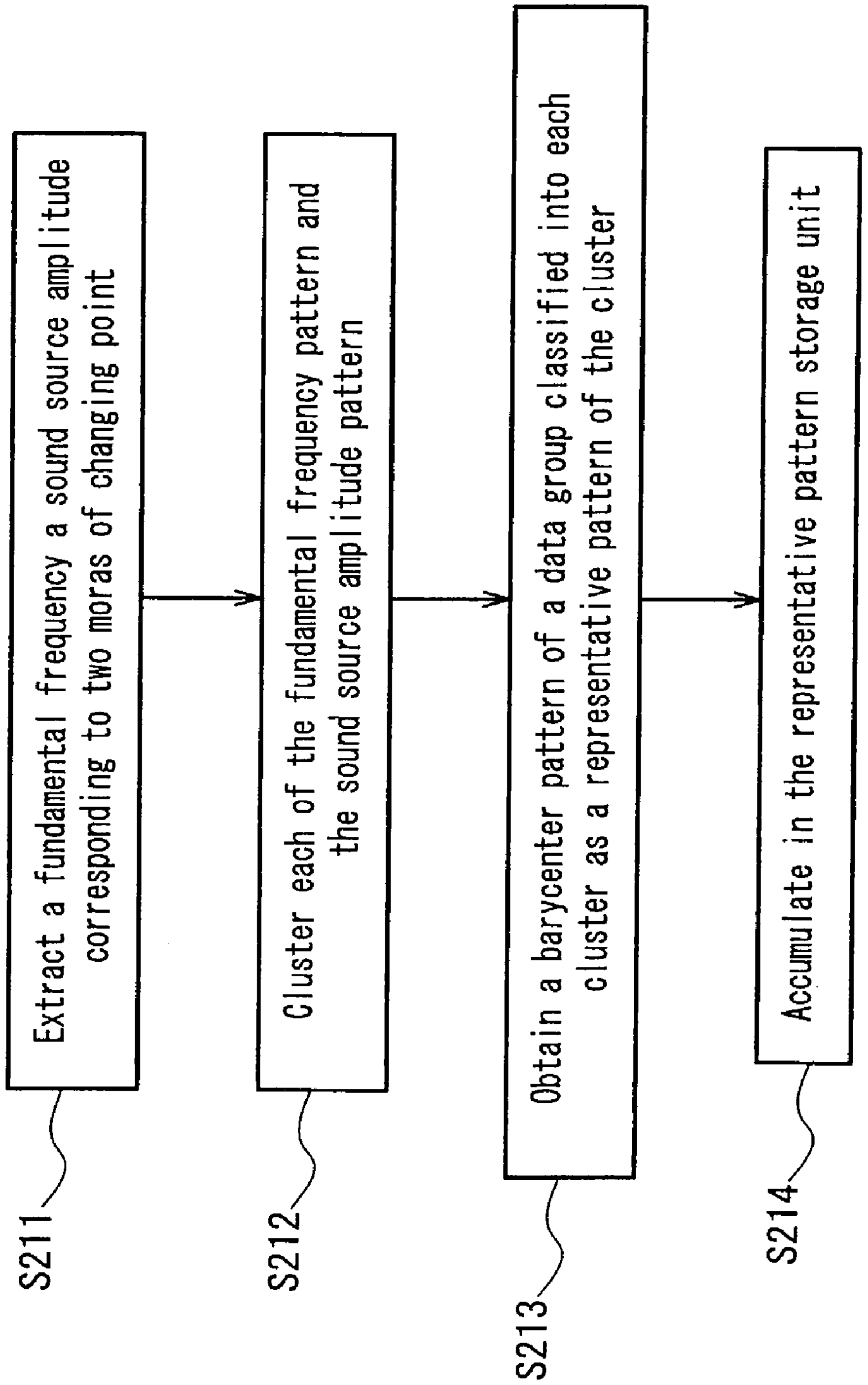
FIG. 6 is a flowchart showing a part of the operations by the pattern/rule generation apparatus according to Embodiment 2.

The representative pattern generation unit 2030, as shown in FIG. 6, extracts a fundamental frequency pattern and a sound source amplitude pattern corresponding to two moras for each of the changing points extracted by the changing point extraction unit 2020 from the natural speech database 2010 (Step S211). The representative pattern generation unit 2030 clusters each of the fundamental frequency pattern and the sound source amplitude pattern extracted in Step S211 (Step S212), and obtains a barycenter pattern for each of the generated clusters (Step S213). Further, the representative pattern generation unit 2030 stores the obtained barycenter pattern for each cluster as a representative pattern for the cluster in the representative pattern storage unit 2040*a* (Step S214).

Figure 7:
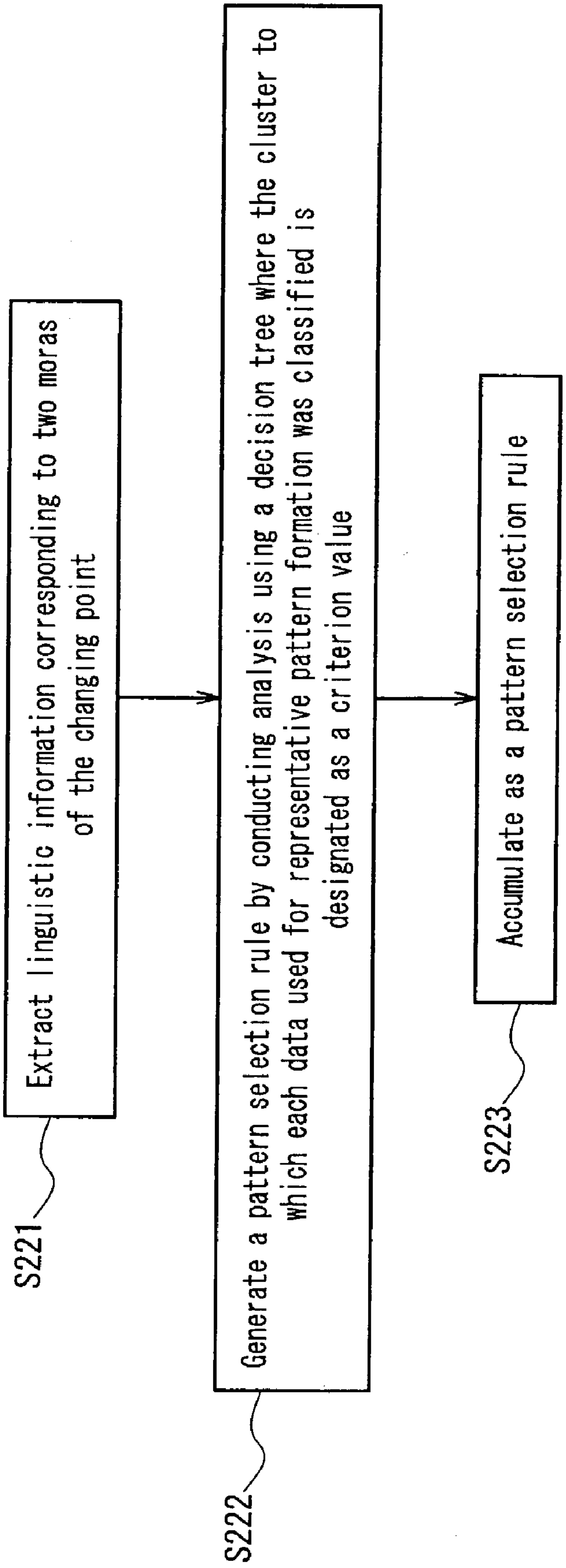
FIG. 7 is a flowchart showing a part of the operations by the pattern/rule generation apparatus according to Embodiment 2.

The pattern selection rule generation unit 2050, as shown in FIG. 7, firstly extracts from the natural speech database 2010 linguistic information corresponding to two moras of each of the changing points as data on the changing point classified into a cluster by the representative pattern generation unit 2030 (Step S221). In this embodiment, the linguistic information includes a position of the mora in a clause, a distance from the standard accent, a distance from a punctuation mark and a part of speech. A series of phonemes corresponding to two moras and their linguistic information are designated as explanatory variables and the cluster into which the changing point has been classified by the representative pattern generation unit 2030 is designated as a criterion value, then analysis using a decision tree is conducted, so that a rule for pattern selection is generated (Step S222). The pattern selection rule generation unit 2050 accumulates the rule generated in Step S222 as the selection rule for a representative pattern of the changing point in the pattern selection rule table 2060*a* (Step S223).

Figure 8:
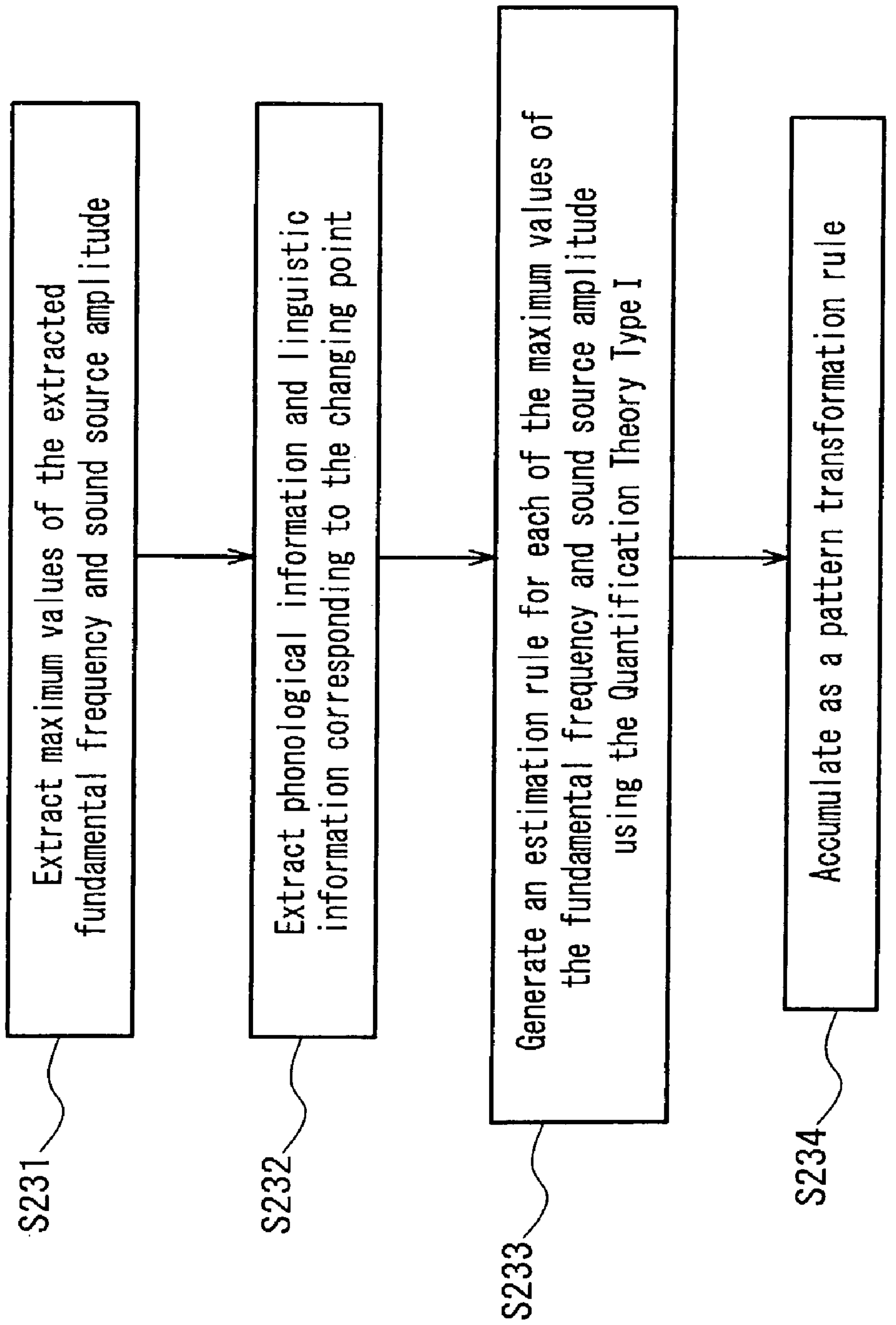
FIG. 8 is a flowchart showing a part of the operations by the pattern/rule generation apparatus according to Embodiment 2.

The pattern transformation rule generation unit 2070, as shown in FIG. 8, extracts a maximum value of a fundamental frequency and a maximum value of a sound source amplitude corresponding to two moras of each of the changing points extracted by the changing point extraction unit 2020 from the natural speech database 2010 (Step S231). Also, the pattern transformation rule generation unit 2070 extracts phonological information and linguistic information corresponding to each of the changing points (Step S232). In this embodiment, the phonological information is a series of phonemes of each of two moras at the changing point, and the linguistic information includes a position of the mora in a clause, a distance from the standard accent, a distance from a punctuation mark and a part of speech. The pattern transformation rule generation unit 2070 applies the Quantification Theory Type I model to each of the fundamental frequency and the sound source amplitude so as to generate an estimation rule of the maximum value of the fundamental frequency and an estimation rule of the maximum value of the sound source amplitude, where the phonological information and the linguistic information extracted in Step S232 are designated as explanatory variables and the maximum values of the fundamental frequency and the sound source amplitude obtained in Step S231 are designated as criterion variables (Step S233). The pattern transformation rule generation unit 2070 stores the estimation rule of the maximum value of the fundamental frequency generated in Step S233 as a shift rule of the fundamental frequency pattern along the logarithmic frequency axis and stores the estimation rule of the maximum value of the sound source amplitude as a shift rule of the sound source amplitude pattern along the logarithmic axis of the amplitude value in the pattern transformation rule table 2080*a* (Step S234).

Figure 9:
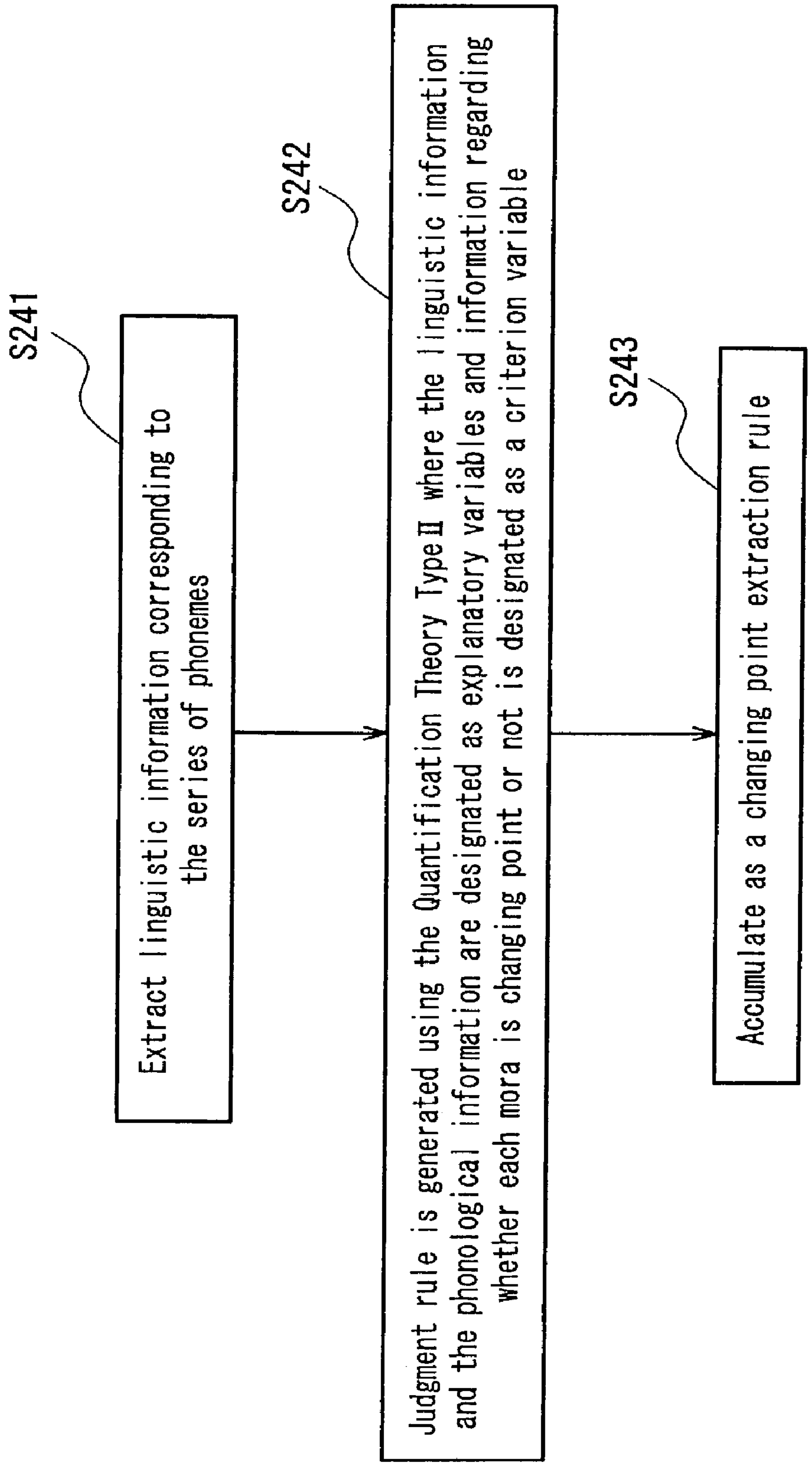
FIG. 9 is a flowchart showing a part of the operations by the pattern/rule generation apparatus according to Embodiment 2.
Figure 10:
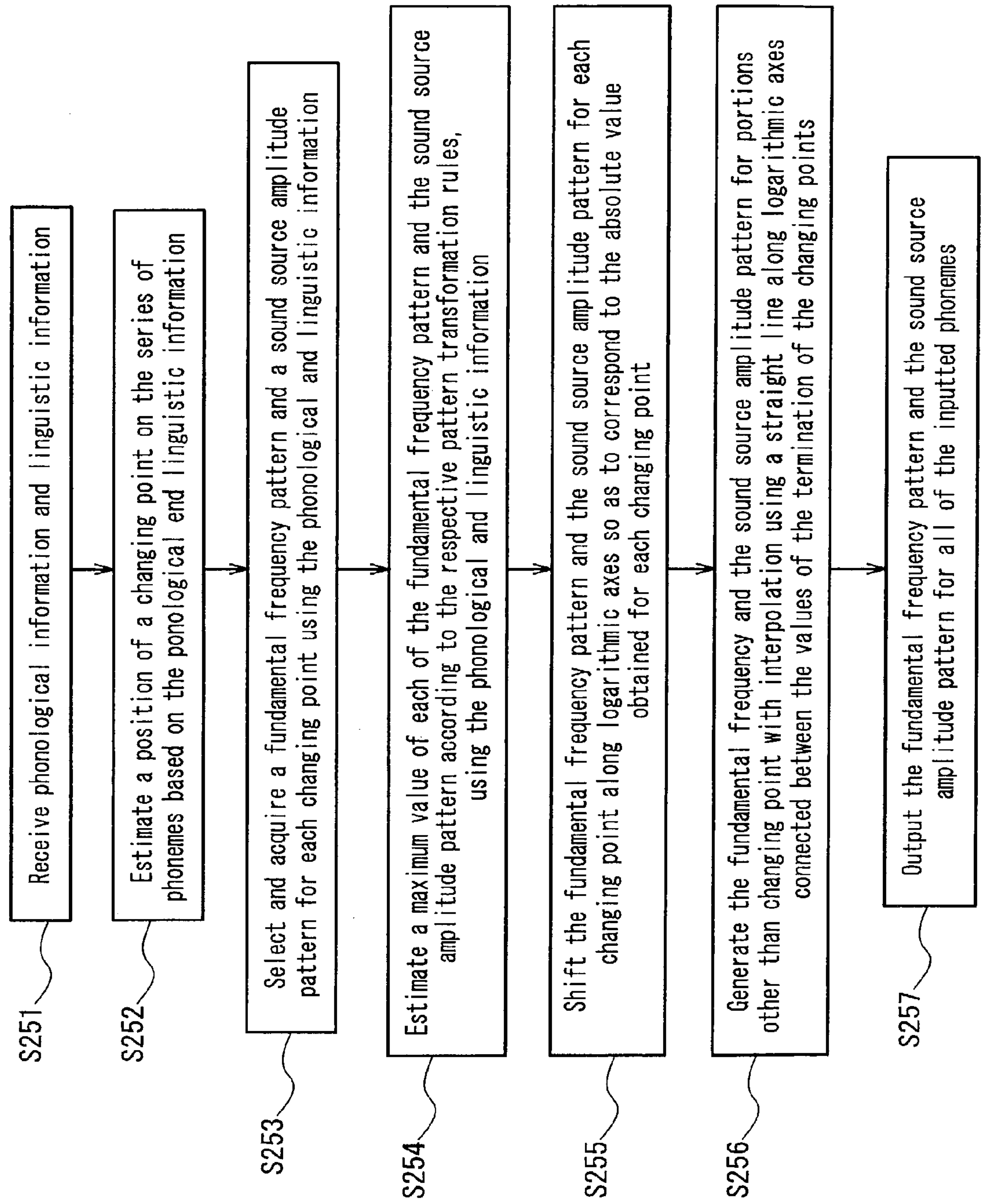
FIG. 10 is a flowchart showing operations by the prosodic information generation apparatus according to Embodiment 2.

The changing point extraction rule generation unit 2090, as shown in FIG. 9, extracts linguistic information corresponding to the series of phonemes with which the information as to the changing point or otherwise has been tagged by the changing point extraction unit 2020, from the natural speech database 2010 (Step S241). In this embodiment, the linguistic information includes attributes of a clause, a part of speech, a position of a mora in a clause, a distance from the standard accent and a distance from a punctuation mark. Then, the Quantification Theory Type II model is applied so that a changing point extraction rule for judging whether each mora is a changing point or not from the phonological information and the linguistic information is generated (Step S242), where the types of the mora as the phonological information and the linguistic information extracted in Step S241 are designated as explanatory variables, and the processing result of the changing point extraction unit 2020 regarding whether each mora is a changing point or not is designated as a criterion variable. The thus generated changing point extraction rule is stored in the changing point extraction rule table 2100*a* (Step S243).

As stated above, the pattern/rule generation apparatus generates the representative pattern, the pattern selection rule, the pattern transformation rule and the changing point extraction rule, which are stored in the representative pattern storage unit 2040*a*, the pattern selection rule table 2060*a*, the pattern transformation rule table 2080*a* and the changing point extraction rule table 2100*a*, respectively. Then, these patterns and rules stored in the representative pattern storage unit 2040*a*, the pattern selection rule table 2060*a*, the pattern transformation rule table 2080*a* and the changing point extraction rule table 2100*a* are copied to the representative pattern storage unit 2040*b*, the pattern selection rule table 2060*b*, the pattern transformation rule table 2080*b* and the changing point extraction rule table 2100*b* in the prosodic information generation apparatus shown in FIG. 4, respectively.

The following describes operations of the prosodic information generation apparatus, with reference to FIG. 10.

The prosodic information generation apparatus, as shown in FIG. 4 also, receives phonological information and linguistic information (Step S251). In this embodiment, the phonological information is a series of phonemes tagged with mora break marks, and the linguistic information includes attributes of a clause, a part of speech, a position of a mora in a clause, a distance from the standard accent and a distance from a punctuation mark.

The changing point setting unit 2110 refers to the changing point extraction rule table 2100*b*, in which the changing point extraction rules accumulated by the pattern/rule generation apparatus shown in FIG. 3 are stored, so as to estimate that each phoneme is a prosody changing point or not according to the Quantification Theory Type II model, based on the phonological information and the linguistic information inputted in Step S251. Thereby a position of the prosody changing point on the series of phonemes is estimated (Step S252).

Next, the pattern selection unit 2120 refers to the pattern selection rule table 2060*b* so as to estimate clusters into which each of the fundamental frequency and the sound source amplitude for the changing point belongs using a decision tree. In the selection rule table 2060*b*, the pattern selection rules accumulated by the pattern/rule generation apparatus shown in FIG. 3 are stored for each of the changing points set by the changing point setting unit 2110 using the series of phonemes and the linguistic information corresponding to the changing point. Then, the pattern selection unit 2120 obtains representative patterns of the corresponding clusters from the representative pattern storage unit 2040*b* as a fundamental frequency pattern and a sound source amplitude pattern corresponding to the changing point (Step S253).

The prosody generation unit 2130 refers to the pattern transformation rule table 2080*b*, in which the pattern transformation rules accumulated by the pattern/rule generation apparatus shown in FIG. 3 are stored, so as to estimate the maximum value of the fundamental frequency pattern on the logarithmic frequency axis and the maximum value of the sound source amplitude on the logarithmic axis of the changing point using the Quantification Theory Type I model (Step S254). Then, the prosody generation unit 2130 shifts the fundamental frequency pattern obtained in Step S253 along the logarithmic frequency axis with reference to the maximum value. Similarly, the prosody generation unit 2130 shifts the sound source amplitude pattern obtained in Step S253 also along the logarithmic axis with reference to the maximum value (Step S255).

Next, the prosody generation unit 2130 generates values of the fundamental frequency and the sound source amplitude for all of the phonemes by interpolating a fundamental frequency and a sound source amplitude corresponding to a phoneme other than changing points with a straight line along logarithmic axes connected between the fundamental frequency patterns and between the sound source amplitude patterns, which are set as changing points. (Step S256). Then, the prosody generation unit 2130 outputs the thus generated data (Step S257).

According to this method, unlike the conventional method where a complicated unit including a plurality of changing points and many variations is used as the unit of prosody control, a prosody changing point is set automatically according to a rule based on the inputted phonological and linguistic information, prosodic information is determined for each prosody changing point individually using the prosody changing point as the unit of prosody control, and prosodic information on portions other than the changing points is generated with interpolation. Thereby, a natural prosody with less distortion can be generated using a small amount of pattern data. Note here that although this embodiment deals with the example where the prosodic information is generated using the prosody changing points only as the unit of prosody control, the unit is not limited to the prosody changing points but may include a portion including one mora, one syllable, or one phoneme adjacent to the prosody changing point, for example.

In this embodiment, each of the pattern/rule generation apparatus and the prosodic information generation apparatus is provided with the representative pattern storage unit, the pattern selection rule table, the pattern transformation rule table and the changing point extraction rule table, and the representative patterns and the various rules stored in the pattern/rule generation apparatus are copied to the prosodic information generation apparatus. However, as another configuration, the pattern/rule generation apparatus and the prosodic information generation apparatus may share one system including the representative pattern storage unit, the pattern selection rule table, the pattern transformation rule table and the changing point extraction rule table. In this case, the representative pattern storage unit, for example, should be accessible from at least both of the representative pattern generation unit 2030 and the pattern selection unit 2120. Further, as previously mentioned, the pattern/rule generation unit and the prosodic information generation unit may be installed in a single apparatus. In this case, needless to say, the apparatus may be provided with just one system including the representative pattern storage unit, the pattern selection rule table, the pattern transformation rule table and the changing point extraction rule table.

In addition, the apparatus may be configured so that contents contained in at least any one of the representative pattern storage unit 2040*a*, the pattern selection rule table 2060*a*, the pattern transformation rule table 2080*a* and the changing point extraction rule table 2100*a* in the pattern/rule generation apparatus shown in FIG. 3 are copied onto a storage medium such as a DVD, and the prosodic information generation apparatus shown in FIG. 4 refers to this storage medium as the representative pattern storage unit 2040*b*, the pattern selection rule table 2060*b*, the pattern transformation rule table 2080*b* or the changing point extraction rule table 2100*b*.

Note here that the present invention can be embodied as a program that has a computer conduct the operations shown in the flowchart of FIG. 10.

Embodiment 3

A prosody generation apparatus according to Embodiment 3 of the present invention will be described in the following, with reference to FIGS. 11 to 15.

The prosody generation apparatus according to this embodiment includes two systems: (1) a system for generating a variation estimation rule and an absolute value estimation rule based on a natural speech and accumulating the same (estimation rule generation unit); and (2) a system for receiving phonological information and linguistic information and generating prosodic information using the variation estimation rule and the absolute value estimation rule accumulated in the above-described estimation rule generation unit (prosodic information generation unit). The prosody generation apparatus according to this embodiment can be realized as a single apparatus provided with both of these systems, or can be realized including both of these systems as separate apparatuses. The following description deals with the example where these systems are realized as separate apparatuses.

Figure 11:
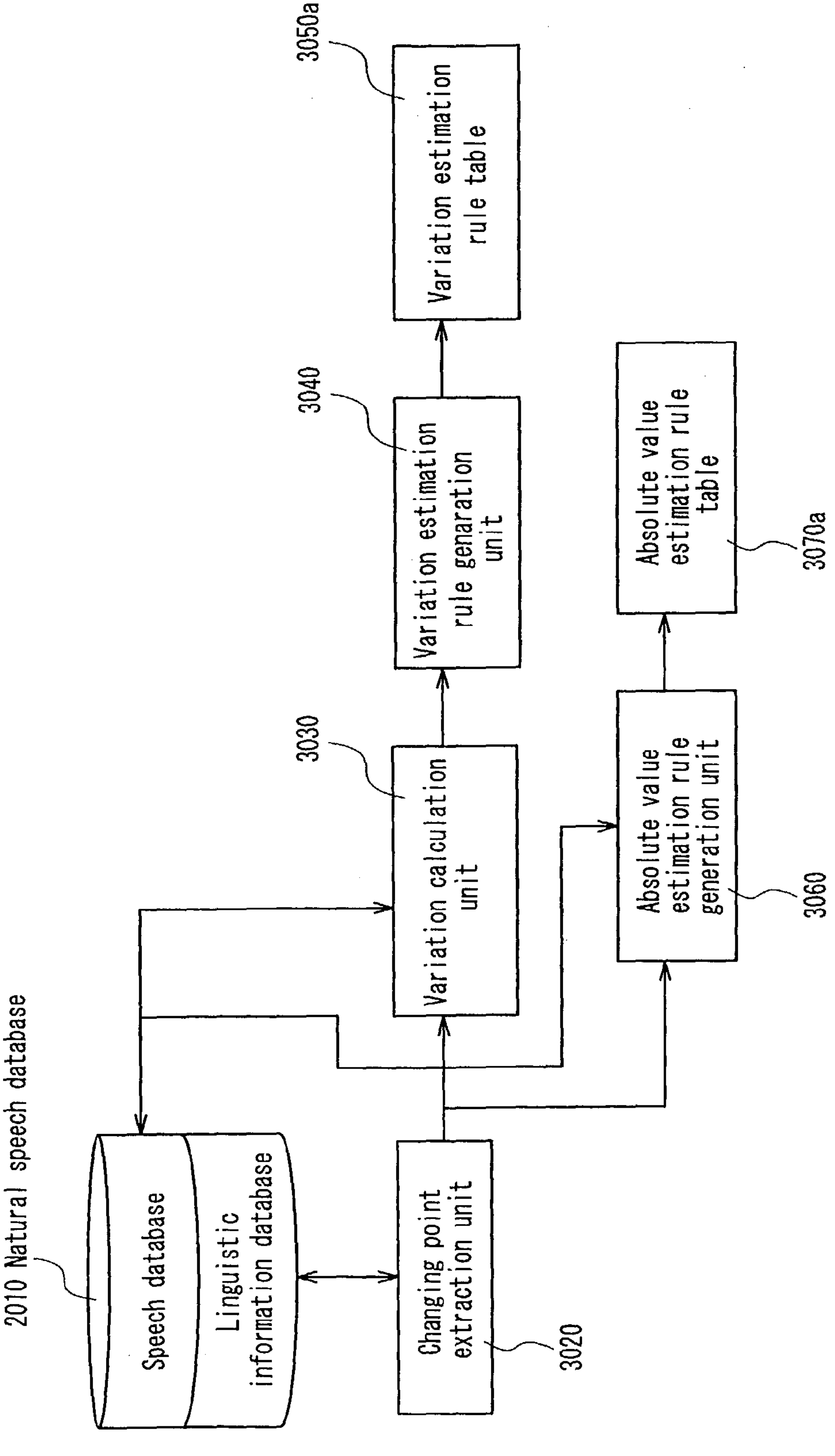
FIG. 11 is a block diagram showing a configuration corresponding to a rule generation unit in a prosody generation apparatus according to Embodiment 3 of the present invention.
Figure 12:
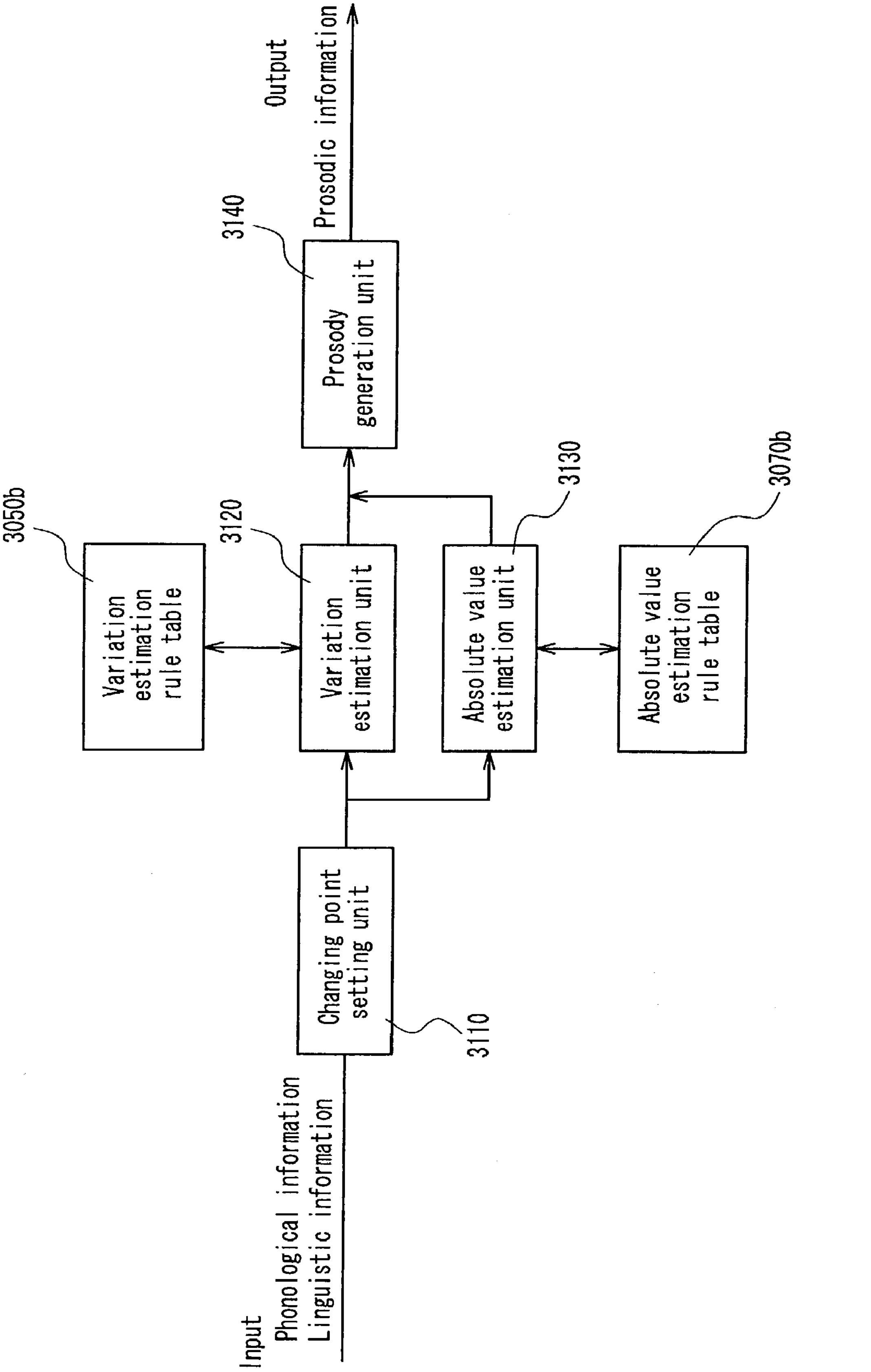
FIG. 12 is a block diagram showing a configuration corresponding to a prosodic information generation apparatus in the prosody generation apparatus according to Embodiment 3 of the present invention.
Figure 13:
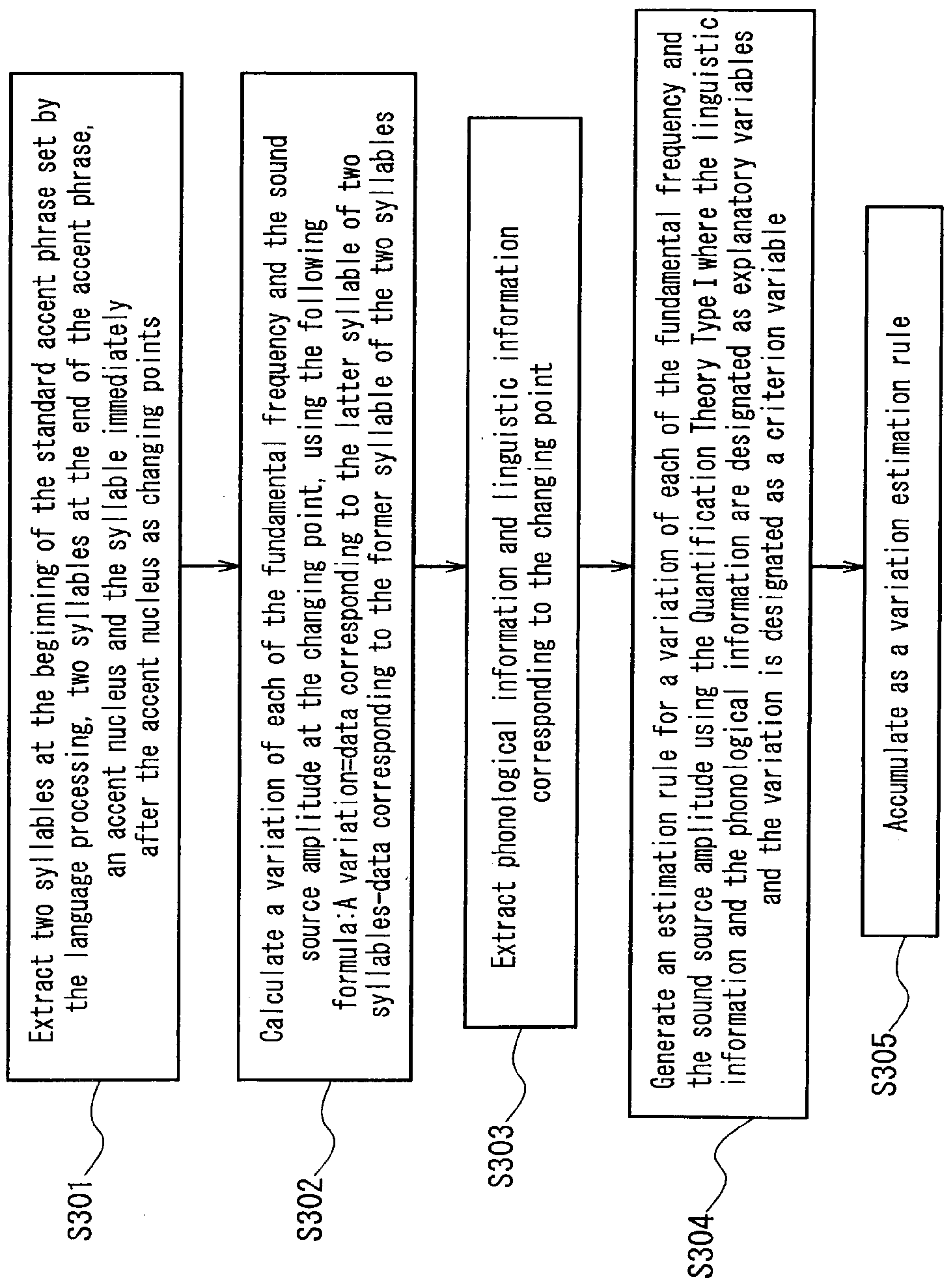
FIG. 13 is a flowchart showing a part of the operations by the rule generation apparatus according to Embodiment 3.
Figure 14:
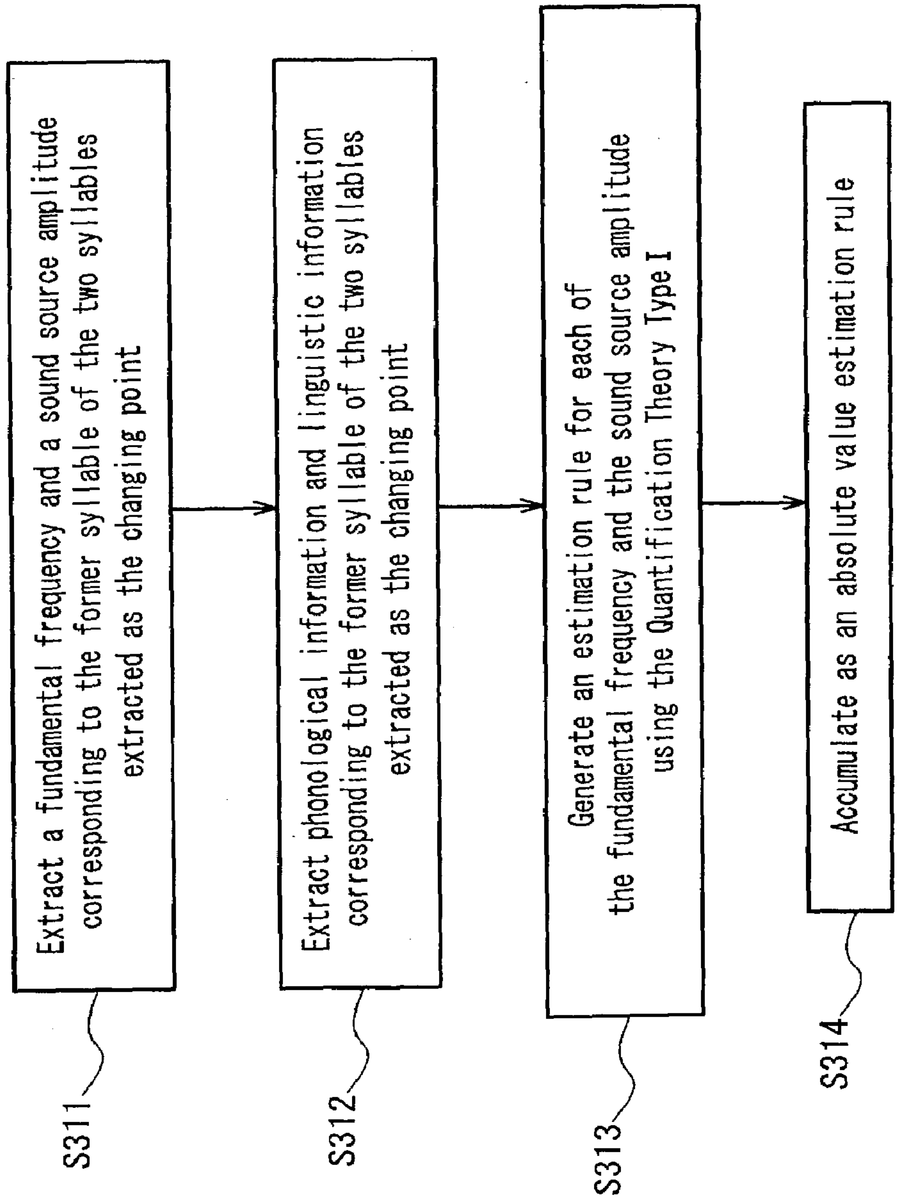
FIG. 14 is a flowchart showing a part of the operations by the rule generation apparatus according to Embodiment 3.
Figure 15:
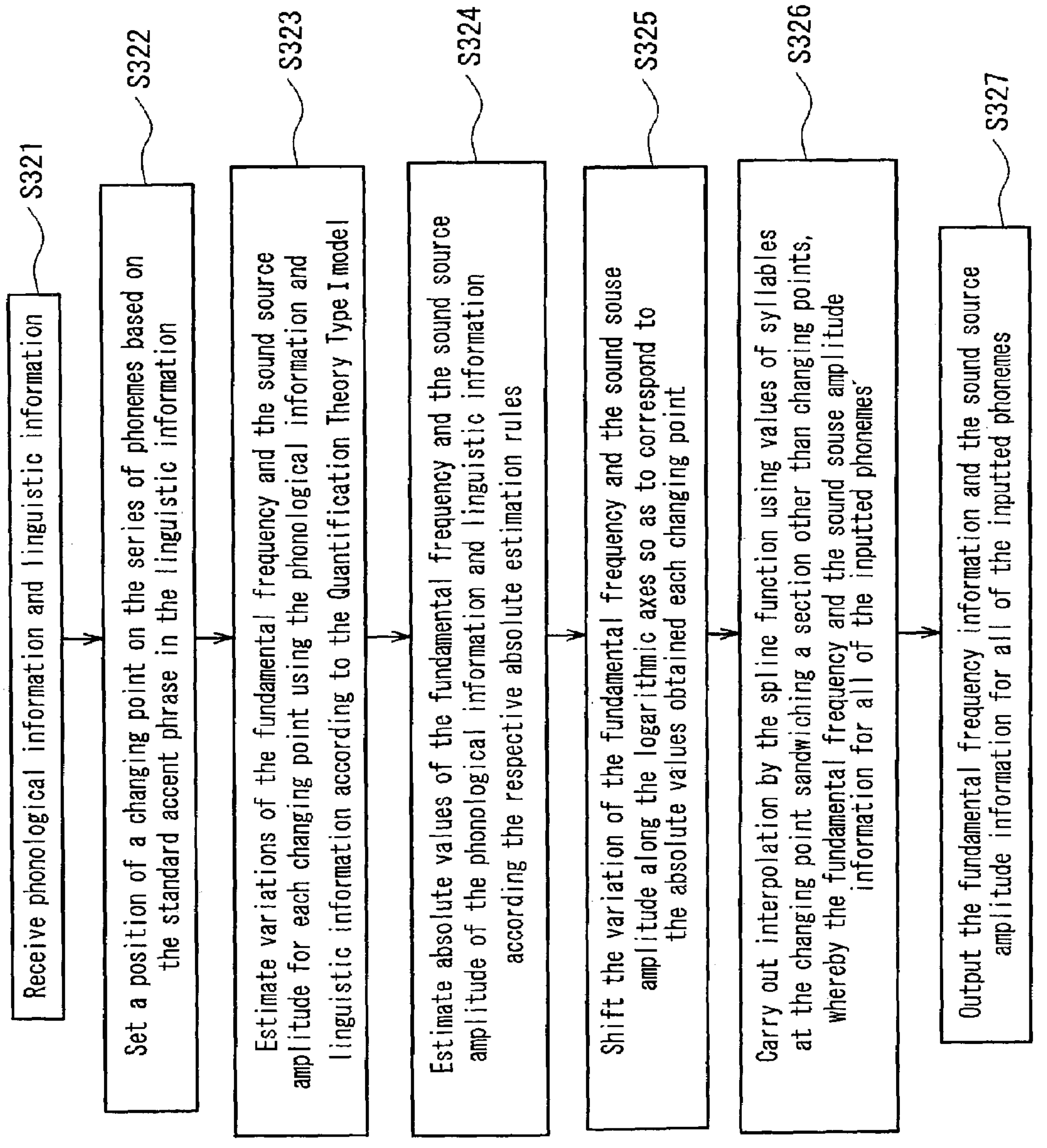
FIG. 15 is a flowchart showing operations by the prosodic information generation apparatus according to Embodiment 3.

FIG. 11 is a block diagram showing a configuration of an estimation rule generation apparatus having a function of the above-described estimation rule generation unit of the prosody generation apparatus according to this embodiment. FIG. 12 is a block diagram showing a configuration of a prosodic information generation apparatus having a function of the prosodic information generation unit. FIGS. 13 and 14 are flowcharts showing operations of the estimation rule generation apparatus shown in FIG. 11, and FIG. 15 is a flowchart showing operations of the prosodic information generation apparatus shown in FIG. 12.

As shown in FIG. 11, the estimation rule generation apparatus of the prosody generation apparatus according to this embodiment includes a natural speech database 2010, a changing point extraction unit 3020, a variation calculation unit 3030, a variation estimation rule generation unit 3040, a variation estimation rule table 3050*a*, an absolute value estimation rule generation unit 3060 and an absolute value estimation rule table 3070*a*.

As shown in FIG. 12, the prosodic information generation apparatus of the prosody generation apparatus according to this embodiment includes a changing point setting unit 3110, a variation estimation unit 3120, a variation estimation rule table 3050*b*, an absolute value estimation unit 3130, an absolute value estimation rule table 3070*b* and a prosody generation unit 3140.

First, operations of the estimation rule generation apparatus shown in FIG. 11 will be described, with reference to FIGS. 13 and 14. The changing point extraction unit 3020 in the estimation rule generation apparatus extracts two syllables at the beginning of the standard accent phrase as linguistic information generated from text data and two syllables at the end of the accent phrase, an accent nucleus and the syllable immediately after the accent nucleus as changing points, from the natural speech database 2010 that keeps a natural speech and acoustic characteristics data and linguistic information corresponding to the speech (Step S301).

Next, the variation calculation unit 3030 calculates a variation of each of the fundamental frequency and the sound source amplitude of two syllables at each of the changing points extracted in Step S301, using the following formula (Step S302).

A variation=data corresponding to the latter syllable of two syllables−data corresponding to the former syllable of the two syllables The variation estimation rule generation unit 3040 extracts phonological information and linguistic information corresponding to the two syllables at the changing point from the natural speech database 2010 (Step S303). In this embodiment, the phonological information is obtained by classifying the syllables in terms of phonetics, and the linguistic information includes a position of the syllables in a clause, a distance from the standard accent position, a distance from a punctuation mark and a part of speech. Furthermore, the variation estimation rule generation unit 3040 generates an estimation rule as to the fundamental frequency and the sound source amplitude of the changing point according to the Quantification Theory Type I, where the phonological information and the linguistic information are designated as explanatory variables and the variation of the fundamental frequency and the sound source amplitude are designated as criterion variables (Step S304). After that, the estimation rule generated in Step S304 is accumulated as a variation estimation rule of the changing point in the variation estimation rule table 3050*a* (Step S305).

The absolute value estimation rule generation unit 3060 extracts from the natural speech database 2010 a fundamental frequency and a sound source amplitude corresponding to the former syllable of the two syllables extracted as the changing point in Step S301 by the changing point extraction unit 3020 (Step S311). In addition, the absolute value estimation rule generation unit 3060 extracts from the natural speech database 2010 phonological information and linguistic information corresponding to the former syllable of the two syllables extracted as the changing point (Step S312). In this embodiment, the phonological information is obtained by classifying the syllables in terms of phonetics, and the linguistic information includes a position of the syllables in a clause, a distance from the standard accent position, a distance from a punctuation mark and a part of speech.

Also, the absolute value estimation rule generation unit 3060 determines absolute values of each of the fundamental frequency and the sound source amplitude of the former syllable of the two syllables at each changing point. Then, an estimation rule as to each of the thus determined absolute values is generated according to the Quantification Theory Type I where the phonological information and the linguistic information are designated as explanatory variables and each of the absolute values is designated as a criterion variable (Step S313). The thus generated rule is accumulated as an absolute value estimation rule in the absolute value estimation rule table (Step S314).

As stated above, the estimation rule generation apparatus accumulates the variation estimation rule and the absolute value estimation rule in the variation estimation rule table 3050*a* and the absolute value estimation rule table 3070*a*. Then, the variation estimation rule and the absolute value estimation rules accumulated in the variation estimation rule table 3050*a* and the absolute value estimation rule table 3070*a* are copied to the variation estimation rule table 3050*b* and the absolute value estimation rule table 3070*b*.

Now, operations of the prosodic information generation apparatus shown in FIG. 12 will be described in the following, with reference to FIG. 15. The prosodic information generation apparatus, as shown in FIG. 12 also, receives phonological information and linguistic information (Step S32 1). In this embodiment, the phonological information is obtained by classifying syllables in terms of phonetics, and the linguistic information includes a position of the syllables in a clause, a distance from the standard accent position, a distance from a punctuation mark, a part of speech, attributes of a clause and a distance between a modifier and a modifee.

The changing point setting unit 3110 sets a position of a changing point on a series of phonemes, based on the information on the standard accent phrase included in the received linguistic information (Step S322). Note here that although the changing point setting unit 3110 sets a prosody changing point according to the received linguistic information in this case, the method for setting a changing point is not limited to this example, but a prosody changing point may be set according to a predetermined prosody changing point extraction rule based on attributes concerning phonology and attributes concerning linguistic information of a prosody changing point in speech data. In this case, however, a changing point extraction rule table has to be provided so as to allow the changing point setting unit 3110 to refer thereto in the same manner as in Embodiment 2.

The variation estimation unit 3120 refers to the variation estimation rule table 3050*b*, in which the variation estimation rules accumulated by the estimation rule generation apparatus shown in FIG. 11 are stored, so as to estimate variations of the fundamental frequency and the sound source amplitude for each changing point using the received phonological information and linguistic information according to the Quantification Theory Type I model (Step S323).

The absolute value estimation unit 3130 refers to the absolute value estimation rule table 3070*b*, in which the absolute value estimation rules accumulated by the estimation rule generation apparatus shown in FIG. 11 are stored, so as to estimate absolute values of the fundamental frequency and the sound source amplitude of the former syllable of two syllables for each changing point using the received phonological information and linguistic information according to the Quantification Theory Type I model (Step S324).

The prosody generation unit 3140 shits the variations of the fundamental frequency and the sound source amplitude for each changing point, which are estimated in Step S323, along the logarithmic axes so as to correspond to the absolute values of the fundamental frequency and the sound source amplitude of the former syllable of the two syllables, which are estimated in Step S324. Thereby a fundamental frequency and a sound source amplitude of the changing point are determined (Step S325). In addition, the prosody generation unit 3140 obtains information on the fundamental frequency and the sound source amplitude of phonemes other than the changing points using interpolation. That is to say, the prosody generation unit 3140 carries out interpolation by the spline function using syllables at the changing points sandwiching a section other than changing points (i.e., two changing points located on either side of a section other than changing points), whereby the information on the fundamental frequency and the sound source amplitude of portions other than changing points is generated (Step S326). Thus, the prosody generation unit 3140 outputs the information of the fundamental frequency and the sound source amplitude on all of the received series of phonemes (Step S327).

According to this method, unlike the conventional method where a complicated unit including a plurality of changing points and many variations is used as the unit of prosody control, prosodic information on the prosody changing point set according to the linguistic information is estimated as a variation, and prosodic information on portions other than changing points is generated with interpolation. Thereby, a natural prosody with less distortion can be generated without the need of keeping a large amount of data as pattern data.

Note here that although this embodiment deals with the example where each of the estimation rule generation apparatus and the prosodic information generation apparatus is provided with the variation estimation rule table and the absolute value estimation rule table, and the estimation rules accumulated by the estimation rule generation apparatus are copied to the prosodic information generation apparatus. However, as another configuration, the estimation rule generation apparatus and the prosodic information generation apparatus may share one system including the variation estimation rule table and the absolute value estimation rule table. In this case, the variation estimation rule table, for example, should be accessible from at least both of the variation estimation rule generation unit 3040 and the variation estimation unit 3120. Further, as previously mentioned, the estimation rule generation unit and the prosodic information generation unit may be installed in a single apparatus. In this case, the apparatus may be provided with just one system including the variation estimation rule table and the absolute value estimation rule table.

In addition, the apparatus may be configured so that contents contained in at least any one of the variation estimation rule table 3050*a* and the absolute value estimation rule table 3070*a* in the estimation rule generation apparatus shown in FIG. 11 are copied onto a storage medium such as a DVD, and the prosodic information generation apparatus shown in FIG. 12 refers to this storage medium as the variable estimation rule table 3050*b* or the absolute value estimation rule table 3070*b*.

Note here that the present invention can be embodied as a program that has a computer conduct the operations shown in the flowchart of FIG. 15.

Embodiment 4

Figure 16:
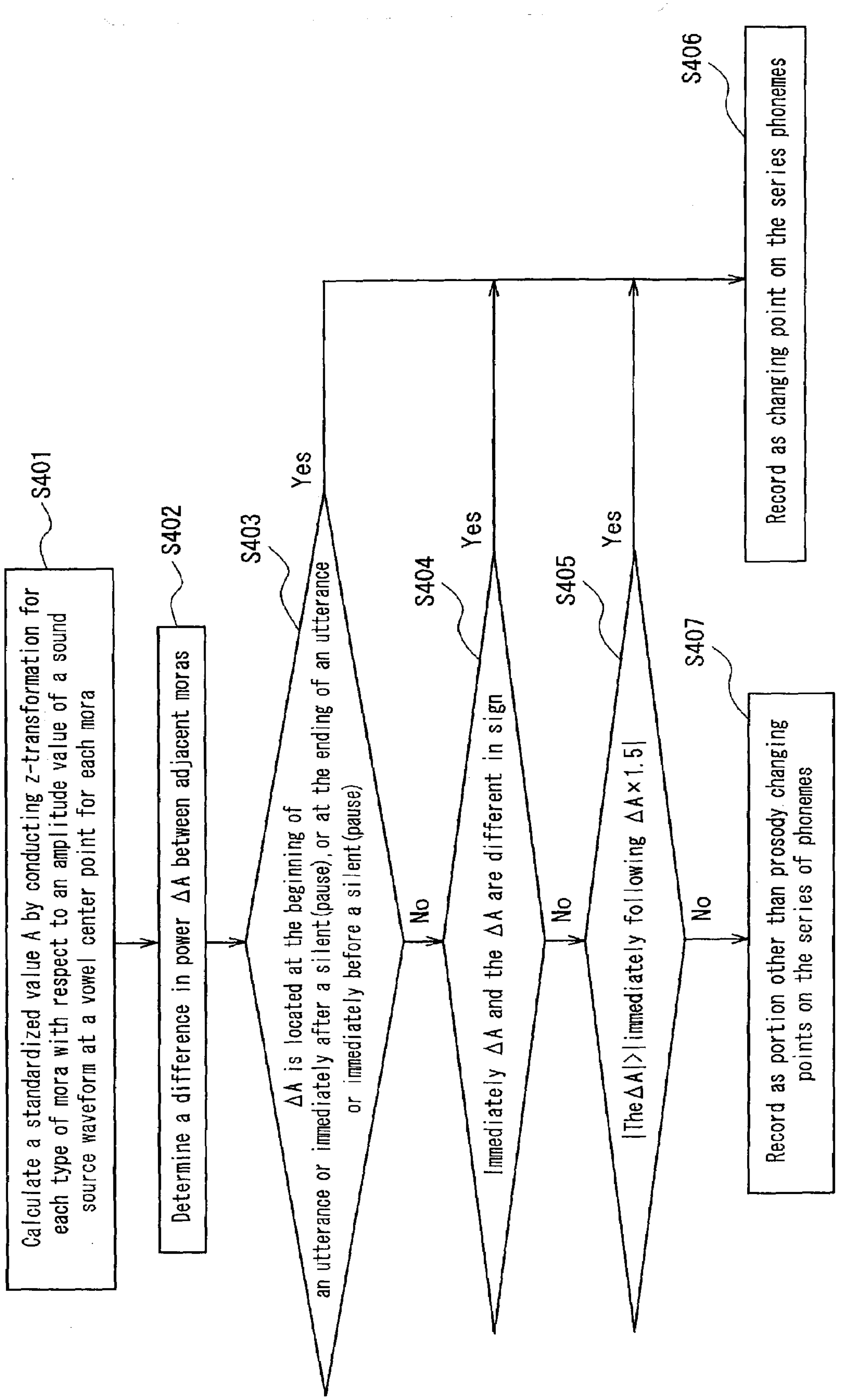
FIG. 16 is a flowchart showing operations by a changing point extraction unit according to Embodiment 4.

A prosody generation apparatus according to Embodiment 4 of the present invention will be described in the following, with reference to FIG. 16.

Although the prosody generation apparatus according to this embodiment is approximately the same as in Embodiment 2, operations of the changing point extraction unit 2020 only are different from those in Embodiment 2. Therefore, the operations of the changing point extraction unit 2020 only will be described in the following.

In the pattern/rule generation apparatus constituting the prosody generation apparatus according to this embodiment, the changing point extraction unit 2020 extracts an amplitude value of a sound waveform at a vowel center point for each mora from the natural speech database 2010 that keeps a natural speech and acoustic characteristics data and linguistic information corresponding to the speech. Then, the changing point extraction unit 2020 classifies the extracted amplitude value of the sound waveform according to the types of moras, and standardizes the classified values for each mora with the z-transformation. The standardized amplitude value of the sound waveform, i.e., the z score of the amplitude of the sound waveform is set as a power (A) of the mora (Step S401). Next, the changing point extraction unit 2020 determines a difference ΔA between the power (A) for each mora and that of the immediately preceding mora according to the following formula (Step S402):

$$\Delta A = \text{the power of the mora} - \text{the power of the immediately preceding mora}$$

If the ΔA is a difference between a power of a mora at the beginning of an utterance or immediately after a pause and a power of the following mora, or if the ΔA is a difference between a power of a mora at the end of an utterance or immediately before a pause and a power of the immediately preceding mora (Step S403), then the mora and the immediately preceding mora are recorded as a prosody changing point so as to correspond to the series of phonemes (Step S406).

In Step S403, if the ΔA is not a difference between a power of a mora at the beginning of an utterance or immediately after a pause and a power of the following mora, and if the ΔA is not a difference between a power of a mora at the end of an utterance or immediately before a pause and a power of the immediately preceding mora, a sign of the immediately preceding ΔA and a sign of the ΔA are compared (Step S404). In Step S404, if the immediately preceding ΔA and the ΔA are different in sign, then the mora and the immediately preceding mora are recorded as a prosody changing point so as to correspond to the series of phonemes (Steps S406).

In Step S404, if the sign of the immediately preceding ΔA and the sign of the ΔA agree with each other, then the ΔA and the immediately following ΔA are compared (step S405). In Step S405, the absolute value of the ΔA is larger than the absolute value of 1.5 times the immediately following ΔA, the mora and the immediately preceding mora are recorded as a changing point so as to correspond to the series of phonemes (Step S406). In Step S405, if the absolute value of the ΔA is not larger than the absolute value of 1.5 times the immediately after ΔA, the mora and the immediately preceding mora are recorded as a portion other than prosody changing points so as to correspond to the series of phonemes (Step S407). Note here that although in this embodiment the judgment as to the prosody changing points is conducted based on the ratio of ΔAs, the judgment can be conducted based on a difference in ΔAs.

Embodiment 5

Figure 17:
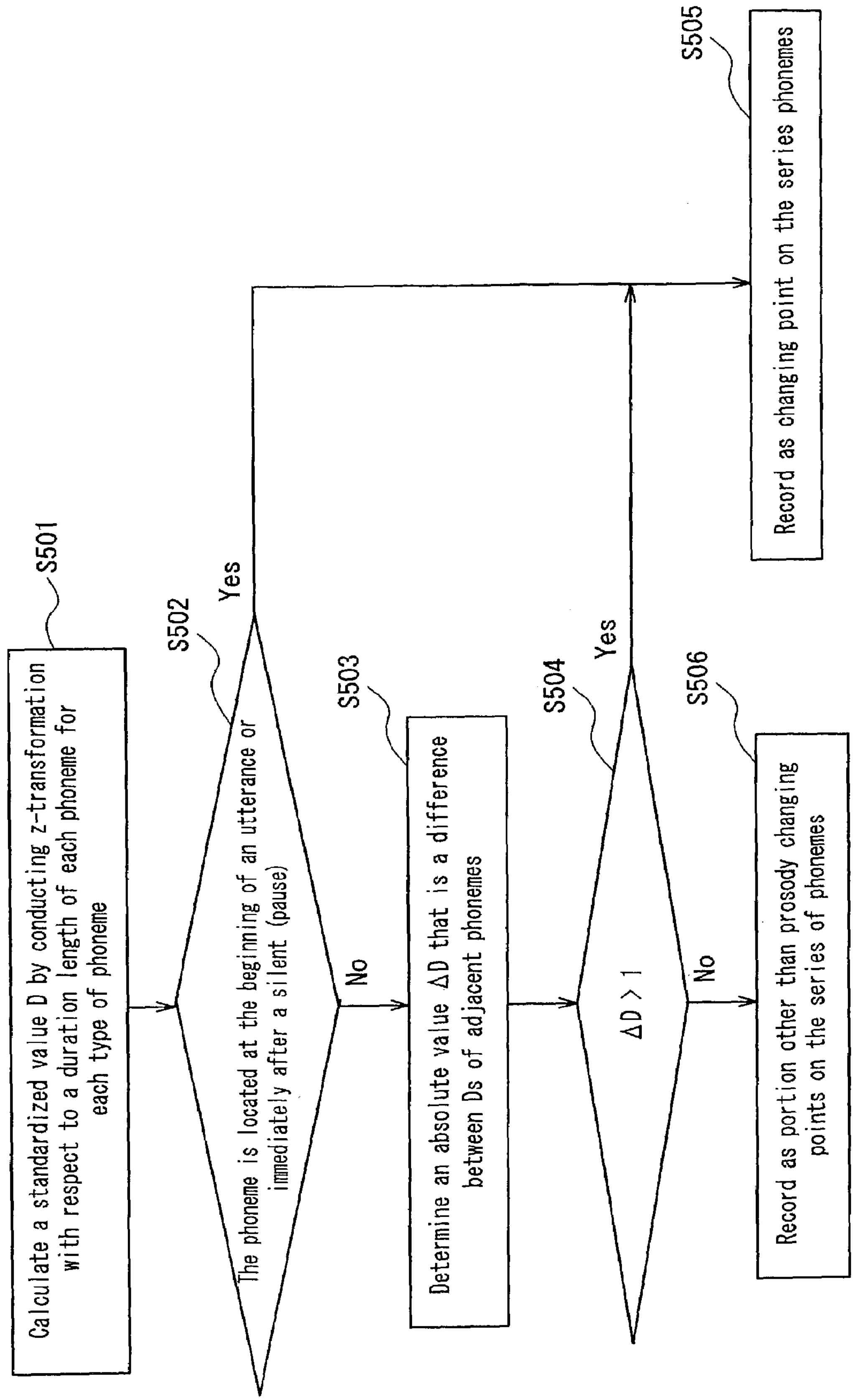
FIG. 17 is a flowchart showing operations by a changing point extraction unit according to Embodiment 5.

A prosody generation apparatus according to Embodiment 5 of the present invention will be described in the following, with reference to FIG. 17. Although the prosody generation apparatus according to this embodiment also is approximately the same as in Embodiment 2, operations of the changing point extraction unit 2020 only are different from those in Embodiment 2. Therefore, the operations of the changing point extraction unit 2020 only will be described in the following.

In the pattern/rule generation apparatus constituting the prosody generation apparatus according to this embodiment, the changing point extraction unit 2020 extracts a duration length for each phoneme from the natural speech database 2010 that keeps a natural speech and acoustic characteristics data and linguistic information corresponding to the speech. Then, the changing point extraction unit 2020 classifies the extracted data on the duration length according to the types of phonemes, and standardizes the classified data for each phoneme with the z-transformation. The standardized duration length of a phoneme is set as a standardized phoneme duration length (D) (Step 501).

If the phoneme is located at the beginning of an utterance, or immediately after a pause (Step S502), then a mora including the phoneme is recorded as a prosody changing point so as to correspond to the series of phonemes (Step S505). In Step S502, if the phoneme is not located at the beginning of an utterance nor immediately after a pause, the absolute value of a difference between the standardized phoneme duration length (D) of the phoneme and that of the immediately preceding phoneme is set as ΔD (Step S503).

Next, the changing point extraction unit 2020 compares ΔD with 1 (Step S504). In Step S504, if ΔD is larger than 1, then a mora including the phoneme is recorded as a prosody changing point so as to correspond to the series of phonemes (Step S505). In Step S504, if ΔD is not larger than 1, then a mora including the phoneme is recorded as a portion other than prosody changing points so as to correspond to the series of phonemes (Step S507).

INDUSTRIAL APPLICABILITY

As stated above, according to the present invention, prosody is generated using prosodic patterns of portions including prosody changing points according to predetermined selection rule and transformation rule, and portions that do not include prosody changing points between the prosodic patterns are obtained with interpolation, whereby an apparatus capable of generating prosody without loss of the naturalness of the prosody can be provided.

The invention claimed is:

1. A prosody generation apparatus that receives phonological information and linguistic information so as to generate prosody, the prosody generation apparatus referring to (a) a variation estimation rule storage unit that stores a variation estimation rule of prosody at prosody changing points, the variation estimation rule being predetermined beforehand according to attributes concerning phonology or attributes concerning linguistic information of the prosody changing points of speech data; and (b) an absolute value estimation rule storage unit that stores an absolute value estimation rule of the prosody at the prosody changing points, the absolute value estimation rule being predetermined beforehand according to attributes concerning the phonology or the linguistic information of the prosody changing points of the speech data; comprising:

a prosody changing point setting unit that sets a prosody changing point according to at least any one of the received phonological information and the linguistic information;

a variation estimation unit that estimates a variation of prosody at the prosody changing point according to the estimation rule stored in the variation estimation rule storage unit, based on the received phonological information and the linguistic information;

an absolute value estimation unit that estimates an absolute value of the prosody at the prosody changing point according to the absolute value estimation rule stored in the absolute value estimation rule storage unit, based on the received phonological information and the linguistic information; and a prosody generation unit that generates prosody for a prosody changing point by shifting the variation estimated by the variation estimation unit so as to correspond to the absolute value obtained by the absolute value estimation unit and generates prosody for a portion other than prosody changing points by carrying out interpolation between the thus generated prosody for prosody changing points.

2. The prosody generation apparatus according to claim 1, wherein the variation of the prosody is a variation in pitch.

3. The prosody generation apparatus according to claim 1, wherein the variation of the prosody is a variation in power.

4. The prosody generation apparatus according to claim 3, wherein the power is (i) a value obtained by standardizing a power of a mora or a syllable for each type of phonology, or (ii) an amplitude value of a sound source waveform of a mora or a syllable.

5. The prosody generation apparatus according to claim 1, wherein the variation estimation rule is obtained by formulating a relationship between (i) a variation in prosody at a prosody changing point of the speech data and (ii) attributes concerning phonology or attributes concerning linguistic information of moras or syllables corresponding to the prosody changing point, by means of a statistical technique or a learning technique so as to predict a variation of prosody using at least one of the attributes concerning phonology and the attributes concerning linguistic information.

6. The prosody generation apparatus according to claim 5, wherein the statistical technique is the Quantification Theory Type I where the variation in prosody is designated as a criterion variable.

7. The prosody generation apparatus according to claim 5, wherein the statistical technique is a multivariate analysis.

8. The prosody generation apparatus according to claim 1, wherein the absolute value estimation rule is obtained by formulating a relationship between (i) an absolute value of a referential point for calculating a prosody variation at a prosody changing point of the speech data and (ii) attributes concerning phonology or attributes concerning linguistic information of moras or syllables corresponding to the changing point, by means of a statistical technique or a learning technique so as to predict an absolute value of a referential point for calculating a prosody variation using at least one of the attributes concerning phonology and the attributes concerning linguistic information.

9. The prosody generation apparatus according to claim 8, wherein the statistical technique is the Quantification Theory Type I where the absolute value of the referential point for calculating the prosody variation is designated as a criterion variable.

10. The prosody generation apparatus according to claim 8, wherein the statistical technique is the Quantification Theory Type I where an amount to shift the referential point for calculating the prosody variation is designated as a criterion variable.

11. The prosody generation apparatus according to claim 8, wherein the statistical technique is a multivariate analysis.

12. The prosody generation apparatus according to claim 1, wherein the interpolation is a linear interpolation, by means of a spline function, or by means of a sigmoid curve.

13. The prosody generation apparatus according to claim 1, wherein the prosody changing point includes at least one of a beginning of an accent phrase, an ending of an accent phrase and an accent nucleus.

14. The prosody generation apparatus according to claim 1, wherein assuming that a difference in pitch between adjacent moras or adjacent syllables of the speech data is ΔP, the prosody changing point is a point where the ΔP and an immediately following ΔP are different in sign.

15. The prosody generation apparatus according to claim 1, wherein assuming that a difference in pitch between adjacent moras or adjacent syllables of the speech data is ΔP, the prosody changing point is a point where the ΔP and an immediately following ΔP have a same sign and a ratio between the ΔP and the immediately following ΔP exceeds a predetermined value.

16. The prosody generation apparatus according to claim 1, wherein assuming that a difference in pitch between adjacent moras or adjacent syllables of the speech data is ΔP, the prosody changing point is a point where the ΔP and an immediately following ΔP have a same sign and a difference between the ΔP and the immediately following ΔP exceeds a predetermined value.

17. The prosody generation apparatus according to claim 5, wherein the prosody changing point setting unit sets the prosody changing point using at least one of the received phonological information and linguistic information, according to a prosody changing point extraction rule predetermined based on attributes concerning the phonology and attributes concerning the linguistic information of the prosody changing point of the speech data.

18. The prosody generation apparatus according to claim 1, wherein assuming that a difference in power between adjacent moras or adjacent syllables of the speech data is ΔA, the prosody changing point is a point where the ΔA and an immediately following ΔA are different in sign.

19. The prosody generation apparatus according to claim 1, wherein assuming that a difference in power between adjacent moras or adjacent syllables of the speech data is ΔA, the prosody changing point is a point where the ΔA and an immediately following ΔA have a same sign and a ratio between the ΔA and the immediately following ΔA exceeds a predetermined value.

20. The prosody generation apparatus according to claim 1, wherein assuming that a difference in power between adjacent moras or adjacent syllables of the speech data is ΔA, the prosody changing point is a point where the ΔA and an immediately following ΔA have a same sign and a difference between the ΔA and the immediately following ΔA exceeds a predetermined value.

21. The prosody generation apparatus according to claim 1, wherein assuming that a difference between values obtained by standardizing time lengths of adjacent moras, syllables or phonemes of the speech data for each type of phonology is ΔD, the prosody changing point is a point where the ΔD exceeds a predetermined value.

22. The prosody generation apparatus according to claim 1, wherein assuming that a difference between values obtained by standardizing time lengths of adjacent moras, syllables or phonemes of the speech data for each type of phonology is ΔD, the prosody changing point is a point where the AD and an immediately following ΔD are different in sign.

23. The prosody generation apparatus according to claim 1, wherein assuming that a difference between values obtained by standardizing time lengths of adjacent moras, syllables or phonemes of the speech data for each type of phonology is ΔD, the prosody changing point is a point where the ΔD and an immediately following ΔD have a same sign and a ratio between the ΔD and the immediately following ΔD exceeds a predetermined value.

24. The prosody generation apparatus according to claim 1, wherein assuming that a difference between values obtained by standardizing time lengths of adjacent moras, syllables or phonemes of the speech data for each type of phonology is ΔD, the prosody changing point is a point where the ΔD and an immediately following ΔD have a same sign and a difference between the ΔD and the immediately following ΔD exceeds a predetermined value.

25. The prosody generation apparatus according to claim 1, wherein the attributes concerning phonology includes one or more of the following attributes: (1) the number of phonemes, the number of moras, the number of syllables, an accent position, an accent type, an accent strength, a stress pattern or a stress strength of an accent phrase, a clause, a stress phrase, or a word; (2) the number of moras, the number of syllables or the number of phonemes counted from a beginning of a sentence, a phrase, an accent phrase, a clause, or a word; (3) the number of moras, the number of syllables, or the number of phonemes counted from an ending of a sentence, a phrase, an accent phrase, a clause, or a word; (4) the presence or absence of adjacent pauses; (5) a time length of adjacent pauses; (6) a time length of a pause located before and the nearest to the prosody changing point; (7) a time length of a pause located after and the nearest to the prosody changing point; (8) the number of moras, the number of syllables or the number of phonemes counted from a pause located before and the nearest to the prosody changing point; (9) the number of moras, the number of syllables or the number of phonemes counted from a pause located after and the nearest to the prosody changing point; and (10) the number of moras, the number of syllables or the number of phonemes counted from an accent nucleus or a stress position.

26. The prosody generation apparatus according to claim 1, wherein the attributes concerning linguistic information includes one or more of the following attributes: a part of speech, an attribute concerning a modification structure, a distance to a modiflee, a distance to a modifier, an attribute concerning syntax, prominence, emphasis, or semantic classification of an accent phrase, a clause, a stress phrase, or a word.

27. A prosody generation method by which phonological information and linguistic information are inputted so as to generate prosody, comprising the steps of:

setting a prosody changing point according to at least any one of the inputted phonological information and linguistic information;

estimating a variation of prosody at the prosody changing point according to a variation estimation rule predetermined beforehand according to attributes concerning phonology or attributes concerning linguistic information of the prosody changing point of speech data, based on the inputted phonological information and linguistic information;

estimating an absolute value of the prosody at the prosody changing point according to an absolute value estimation rule predetermined beforehand according to attributes concerning the phonology or the linguistic information of the prosody changing point of the speech data, based on the inputted phonological information and the linguistic information; and generating prosody for a prosody changing point by shifting the estimated variation so as to correspond to the estimated absolute value and generating prosody for a portion other than prosody changing points by carrying out interpolation between the thus generated prosody for prosody changing points.

28. A computer program stored in a computer-readable medium that has a computer conduct a procedure of receiving phonological information and linguistic information so as to generate prosody, the computer referring to (a) a variation estimation rule storage unit that stores a variation estimation rule of prosody at prosody changing points, the variation estimation rule being predetermined beforehand according to attributes concerning phonology or attributes concerning linguistic information of the prosody changing points of speech data; and (b) an absolute value estimation rule storage unit that stores an absolute value estimation rule of the prosody at the prosody changing points, the absolute value estimation rule being predetermined beforehand according to attributes concerning the phonology or the linguistic information of the prosody changing points of the speech data; the program having the computer conduct the steps of:

setting a prosody changing point according to at least any one of the received phonological information and the linguistic information;

estimating a variation of the prosody at the prosody changing point according to the estimation rule stored in the variation estimation rule storage unit, based on the received phonological information and the linguistic information;

estimating an absolute value of prosody at the prosody changing point according to the absolute value estimation rule stored in the absolute value estimation rule storage unit, based on the received phonological information and the linguistic information; and generating prosody for a prosody changing point by shifting the variation estimated by the variation estimation unit so as to correspond to the absolute value obtained by the absolute value estimation unit and generating prosody for a portion other than prosody changing points by carrying out interpolation between the thus generated prosody for prosody changing points.

* * * * *